(12) United States Patent
Iwabuchi

(10) Patent No.: US 7,961,976 B2
(45) Date of Patent: Jun. 14, 2011

(54) IMAGE DATA RESTORATION APPARATUS, IMAGING APPARATUS, IMAGE DATA RESTORATION METHOD AND COMPUTER READABLE MEDIUM STORING IMAGE DATA RESTORATION PROGRAM

(75) Inventor: Hiroshi Iwabuchi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 943 days.

(21) Appl. No.: 11/892,783

(22) Filed: Aug. 27, 2007

(65) Prior Publication Data
US 2008/0118171 A1    May 22, 2008

(30) Foreign Application Priority Data

Sep. 1, 2006  (JP) ............... P2006-237856
Sep. 1, 2006  (JP) ............... P2006-237860
Sep. 1, 2006  (JP) ............... P2006-237862
Sep. 1, 2006  (JP) ............... P2006-237863

(51) Int. Cl.
*G06K 9/40* (2006.01)
(52) U.S. Cl. ......... 382/275; 382/254; 382/255; 382/274
(58) Field of Classification Search .................. 382/255
See application file for complete search history.

(56) References Cited

U.S. PATENT DOCUMENTS

| 5,365,303 | A | | 11/1994 | Yamasaki et al. |
| 5,414,466 | A | * | 5/1995 | Noreve et al. ................ 348/241 |
| 5,481,565 | A | * | 1/1996 | Pal ................................ 375/232 |
| 7,151,573 | B2 | * | 12/2006 | Kim et al. ..................... 348/607 |
| 2006/0291841 | A1 | * | 12/2006 | Fukumoto et al. ............. 396/55 |
| 2007/0258707 | A1 | * | 11/2007 | Raskar ........................... 396/52 |

FOREIGN PATENT DOCUMENTS

| EP | 0709969 A2 | * | 1/1996 |
| JP | 62-127976 A | | 6/1987 |
| JP | 3-159482 A | | 7/1991 |
| JP | 6-118468 A | | 4/1994 |

OTHER PUBLICATIONS

Japanese Office Action issued in corresponding Japanese Patent Application No. 2006-237863 dated Mar. 29, 2011 (with English translation).

* cited by examiner

*Primary Examiner* — Vikkram Bali
*Assistant Examiner* — Michelle Entezari
(74) *Attorney, Agent, or Firm* — Birch, Stewart, Kolasch & Birch, LLP

(57) ABSTRACT

A method for restoring still image data acquired by capturing a subject image with an imaging element, includes: acquiring blur information regarding blur in a Y direction of the imaging element upon image capturing; sets a recovery matrix for recovering, from the still image data, image data to be acquired upon capturing the subject image in a state where there is no blur; recovers the image data by multiplying the recovery matrix and the still image data; computes plural types of noises which derive from the recovery matrix and which are periodically superimposed on the recovered image data in the Y direction, based on (i) noise period information regarding a noise superimposition period of each noise, (ii) the recovered image data, and (iii) the still image data; and eliminates the computed noise from the recovered image data.

16 Claims, 16 Drawing Sheets

FIG. 5A $$H = \begin{bmatrix} 1 & 1 & 1 & 0 & 0 & 0 & 0 & 0 & 0 & 0 & 0 & 0 \\ 0 & 1 & 1 & 1 & 0 & 0 & 0 & 0 & 0 & 0 & 0 & 0 \\ 0 & 0 & 1 & 1 & 1 & 0 & 0 & 0 & 0 & 0 & 0 & 0 \\ 0 & 0 & 0 & 1 & 1 & 1 & 0 & 0 & 0 & 0 & 0 & 0 \\ 0 & 0 & 0 & 0 & 1 & 1 & 1 & 0 & 0 & 0 & 0 & 0 \\ 0 & 0 & 0 & 0 & 0 & 1 & 1 & 1 & 0 & 0 & 0 & 0 \\ 0 & 0 & 0 & 0 & 0 & 0 & 1 & 1 & 1 & 0 & 0 & 0 \\ 0 & 0 & 0 & 0 & 0 & 0 & 0 & 1 & 1 & 1 & 0 & 0 \\ 0 & 0 & 0 & 0 & 0 & 0 & 0 & 0 & 1 & 1 & 1 & 0 \\ 0 & 0 & 0 & 0 & 0 & 0 & 0 & 0 & 0 & 1 & 1 & 1 \end{bmatrix} / 3$$

FIG. 5B $$F = \begin{bmatrix} 1 & 1 & 1 & 0 & 0 & 0 & 0 & 0 & 0 & 0 \\ 0 & 1 & 1 & 1 & 0 & 0 & 0 & 0 & 0 & 0 \\ 0 & 0 & 1 & 1 & 1 & 0 & 0 & 0 & 0 & 0 \\ 0 & 0 & 0 & 1 & 1 & 1 & 0 & 0 & 0 & 0 \\ 0 & 0 & 0 & 0 & 1 & 1 & 1 & 0 & 0 & 0 \\ 0 & 0 & 0 & 0 & 0 & 1 & 1 & 1 & 0 & 0 \\ 0 & 0 & 0 & 0 & 0 & 0 & 1 & 1 & 1 & 0 \\ 0 & 0 & 0 & 0 & 0 & 0 & 0 & 1 & 1 & 1 \\ 0 & 0 & 0 & 0 & 0 & 0 & 0 & 1 & ② & ③ \\ 0 & 0 & 0 & 0 & 0 & 0 & 0 & 0 & ③ & ③ \end{bmatrix} / 3$$

FIG. 5C $$W = \begin{bmatrix} 3 & -3 & 0 & 3 & -3 & 0 & 3 & -3 & 0 & 1 \\ 0 & 3 & -3 & 0 & 3 & -3 & 0 & 3 & -3 & 1 \\ 0 & 0 & 3 & -3 & 0 & 3 & -3 & 0 & 3 & -2 \\ 0 & 0 & 0 & 3 & -3 & 0 & 3 & -3 & 0 & 1 \\ 0 & 0 & 0 & 0 & 3 & -3 & 0 & 3 & -3 & 1 \\ 0 & 0 & 0 & 0 & 0 & 3 & -3 & 0 & 3 & -2 \\ 0 & 0 & 0 & 0 & 0 & 0 & 3 & -3 & 0 & 1 \\ 0 & 0 & 0 & 0 & 0 & 0 & 0 & 3 & -3 & 1 \\ 0 & 0 & 0 & 0 & 0 & 0 & 0 & 0 & 3 & -2 \\ 0 & 0 & 0 & 0 & 0 & 0 & 0 & 0 & 0 & 1 \end{bmatrix}$$

FIG. 5D $$W*H = \begin{bmatrix} 1 & 0 & 0 & 0 & 0 & 0 & 0 & 0 & 0 & -2/3 & 1/3 & 1/3 \\ 0 & 1 & 0 & 0 & 0 & 0 & 0 & 0 & 0 & 1/3 & -2/3 & 1/3 \\ 0 & 0 & 1 & 0 & 0 & 0 & 0 & 0 & 0 & 1/3 & 1/3 & -2/3 \\ 0 & 0 & 0 & 1 & 0 & 0 & 0 & 0 & 0 & -2/3 & 1/3 & 1/3 \\ 0 & 0 & 0 & 0 & 1 & 0 & 0 & 0 & 0 & 1/3 & -2/3 & 1/3 \\ 0 & 0 & 0 & 0 & 0 & 1 & 0 & 0 & 0 & 1/3 & 1/3 & -2/3 \\ 0 & 0 & 0 & 0 & 0 & 0 & 1 & 0 & 0 & -2/3 & 1/3 & 1/3 \\ 0 & 0 & 0 & 0 & 0 & 0 & 0 & 1 & 0 & 1/3 & -2/3 & 1/3 \\ 0 & 0 & 0 & 0 & 0 & 0 & 0 & 0 & 1 & 1/3 & 1/3 & -2/3 \\ 0 & 0 & 0 & 0 & 0 & 0 & 0 & 0 & 0 & 1/3 & 1/3 & 1/3 \end{bmatrix} \begin{matrix} (1) \\ (2) \\ (3) \\ (1) \\ (2) \\ (3) \\ (1) \\ (2) \\ (3) \\ NG \end{matrix}$$

FIG. 6A $$H = \begin{bmatrix} 1 & 0 & 1 & 0 & 0 & 0 & 0 & 0 & 0 & 0 & 0 \\ 0 & 1 & 0 & 1 & 0 & 0 & 0 & 0 & 0 & 0 & 0 \\ 0 & 0 & 1 & 0 & 1 & 0 & 0 & 0 & 0 & 0 & 0 \\ 0 & 0 & 0 & 1 & 0 & 1 & 0 & 0 & 0 & 0 & 0 \\ 0 & 0 & 0 & 0 & 1 & 0 & 1 & 0 & 0 & 0 & 0 \\ 0 & 0 & 0 & 0 & 0 & 1 & 0 & 1 & 0 & 0 & 0 \\ 0 & 0 & 0 & 0 & 0 & 0 & 1 & 0 & 1 & 0 & 0 \\ 0 & 0 & 0 & 0 & 0 & 0 & 0 & 1 & 0 & 1 & 0 \\ 0 & 0 & 0 & 0 & 0 & 0 & 0 & 0 & 1 & 0 & 1 \\ 0 & 0 & 0 & 0 & 0 & 0 & 0 & 0 & 0 & 1 & 0 \\ 0 & 0 & 0 & 0 & 0 & 0 & 0 & 0 & 0 & 0 & 1 \end{bmatrix} /2$$

FIG. 6B $$F = \begin{bmatrix} 1 & 0 & 1 & 0 & 0 & 0 & 0 & 0 & 0 & 0 \\ 0 & 1 & 0 & 1 & 0 & 0 & 0 & 0 & 0 & 0 \\ 0 & 0 & 1 & 0 & 1 & 0 & 0 & 0 & 0 & 0 \\ 0 & 0 & 0 & 1 & 0 & 1 & 0 & 0 & 0 & 0 \\ 0 & 0 & 0 & 0 & 1 & 0 & 1 & 0 & 0 & 0 \\ 0 & 0 & 0 & 0 & 0 & 1 & 0 & 1 & 0 & 0 \\ 0 & 0 & 0 & 0 & 0 & 0 & 1 & 0 & 1 & 0 \\ 0 & 0 & 0 & 0 & 0 & 0 & 0 & 1 & 0 & 1 \\ 0 & 0 & 0 & 0 & 0 & 0 & 0 & 0 & 1 & ① \\ 0 & 0 & 0 & 0 & 0 & 0 & 0 & 0 & 0 & ② \end{bmatrix} /2$$

FIG. 6C $$W = \begin{bmatrix} 2 & 0 & -2 & 0 & 2 & 0 & -2 & 0 & 2 & -1 \\ 0 & 2 & 0 & -2 & 0 & 2 & 0 & -2 & 0 & 1 \\ 0 & 0 & 2 & 0 & -2 & 0 & 2 & 0 & -2 & -1 \\ 0 & 0 & 0 & 2 & 0 & -2 & 0 & 2 & 0 & 1 \\ 0 & 0 & 0 & 0 & 2 & 0 & -2 & 0 & 2 & -1 \\ 0 & 0 & 0 & 0 & 0 & 2 & 0 & -2 & 0 & 1 \\ 0 & 0 & 0 & 0 & 0 & 0 & 2 & 0 & -2 & -1 \\ 0 & 0 & 0 & 0 & 0 & 0 & 0 & 2 & 0 & 1 \\ 0 & 0 & 0 & 0 & 0 & 0 & 0 & 0 & 2 & -1 \\ 0 & 0 & 0 & 0 & 0 & 0 & 0 & 0 & 0 & 1 \end{bmatrix}$$

FIG. 6D $$W*H = \begin{bmatrix} 1 & 0 & 0 & 0 & 0 & 0 & 0 & 0 & 0 & -0.5 & 1 & -0.5 \\ 0 & 1 & 0 & 0 & 0 & 0 & 0 & 0 & 0 & -0.5 & 0 & 0.5 \\ 0 & 0 & 1 & 0 & 0 & 0 & 0 & 0 & 0 & 0.5 & -1 & 0.5 \\ 0 & 0 & 0 & 1 & 0 & 0 & 0 & 0 & 0 & 0.5 & 0 & -0.5 \\ 0 & 0 & 0 & 0 & 1 & 0 & 0 & 0 & 0 & -0.5 & 1 & -0.5 \\ 0 & 0 & 0 & 0 & 0 & 1 & 0 & 0 & 0 & -0.5 & 0 & 0.5 \\ 0 & 0 & 0 & 0 & 0 & 0 & 1 & 0 & 0 & 0.5 & -1 & 0.5 \\ 0 & 0 & 0 & 0 & 0 & 0 & 0 & 1 & 0 & 0.5 & 0 & -0.5 \\ 0 & 0 & 0 & 0 & 0 & 0 & 0 & 0 & 1 & -0.5 & 1 & -0.5 \\ 0 & 0 & 0 & 0 & 0 & 0 & 0 & 0 & 0 & 0.5 & 0 & 0.5 \end{bmatrix} \begin{matrix} (1) \\ (2) \\ (3) \\ (4) \\ (1) \\ (2) \\ (3) \\ (4) \\ (1) \\ NG \end{matrix}$$

FIG. 8A $$F = \begin{bmatrix} 0 & 0 & 0 & 0 & 0 & 0 & 0 & 0 & 1 & \textcircled{1} \\ 0 & 0 & 0 & 0 & 0 & 0 & 1 & \textcircled{1} & \textcircled{2} \\ 0 & 0 & 0 & 0 & 0 & 1 & 1 & 1 & \textcircled{3} \\ 0 & 0 & 0 & 0 & 1 & 1 & 1 & 0 & 0 & 0 \\ 0 & 0 & 0 & 1 & 1 & 1 & 0 & 0 & 0 & 0 \\ 0 & 0 & 1 & 1 & 1 & 0 & 0 & 0 & 0 & 0 \\ 0 & 1 & 1 & 1 & 0 & 0 & 0 & 0 & 0 & 0 \\ 1 & 1 & 1 & 0 & 0 & 0 & 0 & 0 & 0 & 0 \\ 1 & 1 & 0 & 0 & 0 & 0 & 0 & 0 & 0 & 0 \\ 1 & 0 & 0 & 0 & 0 & 0 & 0 & 0 & 0 & 0 \end{bmatrix} /3$$

FIG. 8B $$W = \begin{bmatrix} 3 & 0 & 0 & 0 & 0 & 0 & 0 & 0 & -3.6363636 & 1.3636364 & -0.1818182 \\ 0 & -3 & 3 & 0 & 0 & 0 & 0 & 0 & 3.0909091 & -1.9090909 & 0.4545455 \\ 3 & -3 & 0 & -3 & 3 & 0 & 0 & 0 & 0.5454545 & 0.5454545 & -0.2727273 \\ 0 & -3 & 3 & 0 & 0 & 0 & 0 & 0 & -3.6363636 & 1.3636364 & -0.1818182 \\ 3 & 0 & -3 & 3 & 0 & -3 & 3 & 0 & 0 & 3.0909091 & -1.9090909 & 0.4545455 \\ 0 & -3 & 3 & 0 & -3 & 3 & 0 & 0 & 0 & 0.5454545 & 0.5454545 & -0.2727273 \\ 3 & 0 & -3 & 3 & 0 & 0 & 0 & 0 & 0 & -3.6363636 & 1.3636364 & -0.1818182 \\ 0 & 0 & 0 & 0 & 0 & 0 & 0 & 0 & 3.0909091 & -1.9090909 & 0.4545455 \\ 0 & 0 & 0 & 0 & 0 & 0 & 0 & 0 & 0.5454545 & 0.5454545 & -0.2727273 \\ 0 & 0 & 0 & 0 & 0 & 0 & 0 & 0 & -0.6363636 & 1.3636364 & -0.1818182 \end{bmatrix}$$

FIG. 8C $$W*H = \begin{bmatrix} 1 & 0 & 0 & 0 & 0 & 0 & 0 & 0 & 0 & -0.2121212 & 0.2424242 & -0.8181818 & 0.3939394 & -0.0606061 & (1) \\ 0 & 1 & 0 & 0 & 0 & 0 & 0 & 0 & 0 & 0.0303030 & 0.3939394 & 0.5454545 & -0.4848485 & 0.1515152 & (2) \\ 0 & 0 & 1 & 0 & 0 & 0 & 0 & 0 & 0 & 0.1818182 & -0.6363636 & 0.2727273 & 0.0909091 & -0.0909091 & (3) \\ 0 & 0 & 0 & 1 & 0 & 0 & 0 & 0 & 0 & -0.2121212 & 0.2424242 & -0.8181818 & 0.3939394 & -0.0606061 & (1) \\ 0 & 0 & 0 & 0 & 1 & 0 & 0 & 0 & 0 & 0.0303030 & 0.3939394 & 0.5454545 & -0.4848485 & 0.1515152 & (2) \\ 0 & 0 & 0 & 0 & 0 & 1 & 0 & 0 & 0 & 0.1818182 & -0.6363636 & 0.2727273 & 0.0909091 & -0.0909091 & (3) \\ 0 & 0 & 0 & 0 & 0 & 0 & 1 & 0 & 0 & -0.2121212 & 0.2424242 & -0.8181818 & 0.3939394 & -0.0606061 & (1) \\ 0 & 0 & 0 & 0 & 0 & 0 & 0 & 1 & 0 & 0.0303030 & 0.3939394 & 0.5454545 & -0.4848485 & 0.1515152 & (2) \\ 0 & 0 & 0 & 0 & 0 & 0 & 0 & 0 & 0 & 1.030303 & 0.3939394 & 0.5454545 & 0.0909091 & -0.0909091 & NG \\ 0 & 0 & 0 & 0 & 0 & 0 & 0 & 0 & 0 & -0.2121212 & 0.2424242 & 0.1818182 & 0.3939394 & -0.0606061 & NG \end{bmatrix}$$

FIG. 17

| FILTER TYPE | INFLUENCE DEGREE | ORDER OF FILTER PROCESSING |
|---|---|---|
| 1 | LARGE | 2 |
| 2 | LARGE | 3 |
| 3 | MAXIMUM | 1 |
| 4 | SMALL | 4 |

IMAGE DATA RESTORATION APPARATUS, IMAGING APPARATUS, IMAGE DATA RESTORATION METHOD AND COMPUTER READABLE MEDIUM STORING IMAGE DATA RESTORATION PROGRAM

CROSS-REFERENCE TO RELATED APPLICATIONS

This application is based upon and claims the benefit of priority from the Japanese Patent Application Nos. 2006-237856 (filed on Sep. 1, 2006), 2006-237860 (filed on Sep. 1, 2006), 2006-237862 (filed on Sep. 1, 2006) and 2006-237863 (filed on Sep. 1, 2006) the entire contents of which are incorporated herein by reference.

BACKGROUND OF THE INVENTION

1. Technical Field

The invention relates to an image data restoration apparatus and an image data restoration method for restoring still image data acquired by capturing a subject image by means of an imaging element, and also relates to an imaging apparatus provided with the image data restoration apparatus and a computer readable medium storing an image data restoration program.

2. Description of the Related Art

In general, there is an image processing apparatus photo-electrically converts a subject image and arithmetically processes the image using an arithmetic device such as a computer. Using this image processing apparatus, various techniques/apparatuses have been proposed for restoring degradation of an image due to camera shake or the like upon image capturing. In this image restoration processing, blurring or spread of one point of an image, which leads to deterioration of the image, into its surrounding image is mathematically handled as a spread function so that arithmetic processing can be done.

For example, JP Hei.6-118468 A (corresponding to U.S. Pat. No. 5,365,303) discloses a method for recovering non-blurred image data by extrapolating missing data to find a pseudo inverse matrix of a blur matrix, which is a matrix expression of a spread function, and by multiplying the pseudo inverse matrix and blurred image data.

However, since the method of JP Hei.6-118468 A extrapolates the missing data, noise may occur in the recovered image data and image quality may be degraded. JP Hei.6-118468 A does not mention about a countermeasure against this noise at all. If nothing is done for the noise, a good restored image may not be achieved.

When a blurred image is restored, complex filter processing is required in proportion to a pixel range to which the influence of blurring extends. There is a room for improvement in that the processing burden on a computer that executes the image processing and that the processing takes long time.

SUMMARY OF THE INVENTION

The invention has been made in view of the above circumstances and provides an image data restoration apparatus and an image data restoration method that can recover non-blurred image data from blurred image data while suppressing image quality from being degraded, and also provides an imaging apparatus provided with the image data restoration apparatus or adopting the image data restoration method and a computer readable medium storing an image data restoration program.

Also, the invention may provide an image data restoration method, a computer readable medium storing an image data restoration program, and an image data restoration apparatus that can reduce the burden of image processing and shorten the processing period of time.

(1) An image data restoration apparatus restores still image data acquired by capturing a subject image with an imaging element, on a basis of blur information regarding blur in a one-dimensional direction of the imaging element upon image capturing. The image data restoration apparatus includes an image data recovering unit, a noise computing unit and a noise eliminating unit. The image data recovering unit multiplies the still image data and a recovery matrix to recover ideal image data. The recovery matrix is used to recover, from the still image data, the ideal image data which is acquired upon capturing the subject image in a state where there is no blur based on the blur information. The recovery matrix is a pseudo inverse matrix of a blur matrix that represents spread in the one-dimensional direction of the ideal image data due to the blur based on the blur information. The noise computing unit computes a plurality of types of noises that derive from the recovery matrix, the plurality of types of noises being periodically superimposed on the image data recovered by the image data recovering unit toward the one-dimensional direction. The noise eliminating unit eliminates the noise computed by the noise computing unit, from the image data recovered by the image data recovering unit. The recovery matrix is an inverse matrix of an approximate matrix. The approximate matrix is obtained by approximating the blur matrix. The approximate matrix is defined so as to extrapolate a predetermined value into values of image data that spreads from an end portion of the ideal image data to an outer side in the one-dimensional direction according to the blur based on the blur information. The noise computing unit computes the plurality of types of noises on a basis of (i) noise period information regarding a noise superimposition period of each of the plurality of types of noises, the noise period information being computed according to a product of the recovery matrix and the blur matrix, (ii) the image data recovered by the image data recovering unit, and (iii) the still image data.

(2) In the image data restoration apparatus of (1), the predetermined value may be a value of image data which is in the end portion of the ideal image data.

(3) The image data restoration apparatus of any one of (1) and (2) may further include a noise period information generating unit that generates the noise period information according to the product of the recovery matrix and the blur matrix.

(4) In the image data restoration apparatus of any one of (1) and (2), the noise computing unit may read the noise period information corresponding to the blur information from a recording medium in which the noise period information corresponding to the blur information is recorded in advance, and use the read noise period information to compute the noises.

(5) In the image data restoration apparatus of any one of (1) to (4), each of the still image data and the image data recovered by the image data recovering unit may have a plurality of pixel data columns arranged in a direction perpendicular to the one-dimensional direction. Each pixel data column is configured to include plural pieces of pixel data aligned in the one-dimensional direction. The noise computing unit may include a first sampling unit, a second sampling unit and a dividing unit. The first sampling unit samples the pixel data of each pixel data column of the still image data, which is a recovery source of the corresponding pixel data column of the image data recovered by the image data recovering unit, at every noise superimposition period based on the noise period information. The second sampling unit samples the pixel data of each pixel data column, which is recovered from the corresponding pixel data column of the still image data as the recovery source, a same number of times as the first sampling unit samples, at every noise superimposition period based the noise period information. The dividing unit computes the noises by dividing a value, which is obtained by subtracting an integrated value of the pixel data sampled by the first sampling unit from an integrated value of the pixel data sampled by the second sampling unit, by the number of times of sampling.

(6) The image data restoration apparatus of any one of (1) to (5) may further include a blur matrix generating unit, an approximate matrix generating unit and a recovery matrix generating unit. The blur matrix generating unit generates the blur matrix on the basis of the blur information. The approximate matrix generating unit generates the approximate matrix from the blur matrix generated by the blur matrix generating unit. The recovery matrix generating unit generates the recovery matrix by computing the inverse matrix of the approximate matrix generated by the approximate matrix generating unit.

(7) The image data restoration apparatus of any one of (1) to (5) may further include a reading unit that reads the recovery matrix corresponding to the blur information from a recording medium in which the recovery matrix corresponding to the blur information is recorded in advance.

(8) An imaging apparatus includes the image data restoration apparatus of any one of (1) to (7), the imaging element; a still image data generating unit and a blur information generating unit. The still image data generating unit generates the still image data from an output signal of the imaging element. The blur information generating unit generates the blur information by detecting blur in the one-dimensional direction of the imaging element upon image capturing.

(9) An image data restoration method for restoring still image data acquired by capturing a subject image with an imaging element, on a basis of blur information regarding blur in a one-dimensional direction of the imaging element upon image capturing, includes: multiplying the still image data and a recovery matrix to recover ideal image data, wherein the recovery matrix is used to recover, from the still image data, the ideal image data which is acquired upon capturing the subject image in a state where there is no blur based on the blur information, and the recovery matrix is a pseudo inverse matrix of a blur matrix that represents spread in the one-dimensional direction of the ideal image data due to the blur based on the blur information; computing a plurality of types of noises that derive from the recovery matrix, the plurality of types of noises being periodically superimposed on the recovered image data toward the one-dimensional direction; and eliminating the computed noise from the recovered image data. The recovery matrix is an inverse matrix of an approximate matrix. The approximate matrix is obtained by approximating the blur matrix. The approximate matrix is defined so as to extrapolate a predetermined value into values of image data that spreads from an end portion of the ideal image data to an outer side in the one-dimensional direction according to the blur based on the blur information. The computing of the plurality of types of noises includes computing the plurality of types of noises on a basis of (i) noise period information regarding a noise superimposition period of each of the plurality of types of noises, the noise period information being computed according to a product of the recovery matrix and the blur matrix, (ii) the recovered image data, and (iii) the still image data.

(10). In the image data restoration method of (9), the predetermined value may be a value of image data which is in the end portion of the ideal image data.

(11) The image data restoration method of any one of (9) to (10) may further include generating the noise period information according to the product of the recovery matrix and the blur matrix.

(12) In the image data restoration method of any one of (9) to (10), the computing of the noises may further include: reading the noise period information corresponding to the blur information from a recording medium in which the noise period information corresponding to the blur information is recorded in advance, and using the read noise period information to compute the noises.

(13) In the image data restoration method of any one of (9) to (12), each of the still image data and the recovered image data may have a plurality of pixel data columns arranged in a direction perpendicular to the one-dimensional direction. Each pixel data column is configured to include plural pieces of pixel data aligned in the one-dimensional direction. The computing of the noises may further include: (a) sampling the pixel data of each pixel data column of the still image data, which is a recovery source of the corresponding pixel data column of the recovered image data, at every noise superimposition period based on the noise period information; (b) sampling the pixel data of each pixel data column, which is recovered from the corresponding pixel data column of the still image data as the recovery source, a same number of times as the (a) sampling is performed, at every noise superimposition period based the noise period information; and (c) computing the noises by dividing a value, which is obtained by subtracting an integrated value of the pixel data sampled by the (a) sampling from an integrated value of the pixel data sampled by the (b) sampling, by the number of times of sampling.

(14) The image data restoration method of any one of (9) to (13) may further include: generating the blur matrix on the basis of the blur information; generating the approximate matrix from the generated blur matrix; and generating the recovery matrix by computing the inverse matrix of the generated approximate matrix.

(15) The image data restoration method of any one of (9) to (13) may further include reading the recovery matrix corresponding to the blur information from a recording medium in which the recovery matrix corresponding to the blur information is recorded in advance.

(16) A computer recording medium stores a program causing a computer to execute a process of restoring still image data acquired by capturing a subject image with an imaging element, on a basis of blur information regarding blur in a one-dimensional direction of the imaging element upon image capturing. The process includes: multiplying the still image data and a recovery matrix to recover ideal image data, wherein the recovery matrix is used to recover, from the still image data, the ideal image data which is acquired upon capturing the subject image in a state where there is no blur based on the blur information, and the recovery matrix is a pseudo inverse matrix of a blur matrix that represents spread in the one-dimensional direction of the ideal image data due to the blur based on the blur information; computing a plurality of types of noises that derive from the recovery matrix, the plurality of types of noises being periodically superimposed on the recovered image data toward the one-dimensional direction; and eliminating the computed noise from the recovered image data. The recovery matrix is an inverse matrix of an approximate matrix. The approximate matrix is obtained by approximating the blur matrix. The approximate matrix is defined so as to extrapolate a predetermined value into values of image data that spreads from an end portion of the ideal image data to an outer side in the one-dimensional direction according to the blur based on the blur information. The computing of the plurality of types of noises includes computing the plurality of types of noises on a basis of (i) noise period information regarding a noise superimposition period of each of the plurality of types of noises, the noise period information being computed according to a product of the recovery matrix and the blur matrix, (ii) the recovered image data, and (iii) the still image data.

With the configuration set forth in any of (1) to (16), an image data restoration apparatus that can recover non-blurred image data from blurred image data while suppressing image quality from being degraded can be provided.

(17) An image data restoration method for restoring a blurred image of a subject, includes: setting a one-dimensional direction of blur in the blurred image; computing blur characteristic information, which is expressed by a point spread function indicating spread of an image caused by the blur, based on the set one-dimensional direction; computing an impulse response of the blur characteristic information; and classifying the blur characteristic information by type based on the impulse response.

(18) An image data restoration method for restoring a blurred image of a subject, includes: setting a one-dimensional direction of blur in the blurred image; computing blur characteristic information, which is expressed by a point spread function indicating spread of an image caused by the blur, based on the set one-dimensional direction; and classifying the blur characteristic information by type by factorizing an inverse blur characteristic function expressed by an inverse function of the point spread function.

(19) In the image data restoration method of (18), the inverse blur characteristic function may be expressed by a polynomial of predetermined variable representing pixel position information. The image data restoration method may further include: determining as to whether or not a coefficient of each term of the polynomial is equal to 0; and after the determining, detecting a magnitude relation between the coefficients of the terms of the polynomial. The classifying may classify the blur characteristic information by type based on the detected magnitude relation.

(20) A computer readable medium stores a program that causes a computer to execute a process for restoring a blurred image of a subject. The process includes: setting a one-dimensional direction of blur in the blurred image; computing blur characteristic information, which is expressed by a point spread function indicating spread of an image caused by the blur, based on the set one-dimensional direction; computing an impulse response of the blur characteristic information; and classifying the blur characteristic information by type based on the impulse response.

(21) A computer readable medium stores a program that causes a computer to execute a process for restoring a blurred image of a subject. The process includes: setting a one-dimensional direction of blur in the blurred image; computing blur characteristic information, which is expressed by a point spread function indicating spread of an image caused by the blur, based on the set one-dimensional direction; and classifying the blur characteristic information by type by factorizing an inverse blur characteristic function expressed by an inverse function of the point spread function.

(22) In the computer readable medium of (21), the inverse blur characteristic function may be expressed by a polynomial of a predetermined variable representing pixel position information. The process may further include: determining as to whether or not a coefficient of each term of the polynomial is equal to 0; and after the determining, detecting a magnitude relation between the coefficients of the terms of the polynomial. The classifying may classify the blur characteristic information by type based on the detected magnitude relation.

(23) An image data restoration apparatus for restoring a blurred image of a subject, includes a setting unit, a first computing unit, a second computing unit and a classifying unit. The setting unit sets a one-dimensional direction of blur in the blurred image. The first computing unit computes blur characteristic information, which is expressed by a point spread function indicating spread of an image caused by the blur, based on the set one-dimensional direction. The second computing unit computes an impulse response of the blur characteristic information. The classifying unit classifies the blur characteristic information by type based on the impulse response.

(24) An image data restoration apparatus for restoring a blurred image of a subject, includes a setting unit, a computing unit and a classifying unit. The setting unit sets a one-dimensional direction of blur in the blurred image. The computing unit computes blur characteristic information, which is expressed by a point spread function indicating spread of an image caused by the blur, based on the set one-dimensional direction. The classifying unit classifies the blur characteristic information by type by factorizing an inverse blur characteristic function expressed by an inverse function of the point spread function.

(25) In the image data restoration apparatus of claim 24, the inverse blur characteristic function may be expressed by a polynomial of a predetermined variable representing pixel position information. The image data restoration apparatus may further include a detecting unit that determines as to whether or not a coefficient of each term of the polynomial is equal to 0 and then detects a magnitude relation between the coefficients of the terms of the polynomial. The classifying unit may classify the blur characteristic information by type based on the detected magnitude relation.

The image data restoration method of (17) discriminate a type of a filter by acquiring an impulse response of the blur characteristic information while by using the blur characteristic information expressed by a point spread function indicating spread of an image caused by the blur. Also, the image data restoration method of (18) discriminates a type of a filter by factorizing the inverse blur characteristic function expressed by a reciprocal of the blur characteristic information. The image data restoration method of (18) can discriminate as to whether or not the inverse blur characteristic function can be solved mathematically, by discriminating coefficient values included in the inverse blur characteristic function. When the inverse blur characteristic function can be solved mathematically, an equation can be solved in the one-dimensional direction. At this time, it can be determined that filter processing using the blur characteristic information is proper. When the inverse blur characteristic function cannot be solved mathematically, the equation cannot be solved in the one-dimensional direction. At this time, it can be determined that filter processing using the blur characteristic information is improper.

According to the above-mentioned configuration of any of (17) to (25), there can be provided the image data restoration method, the computer readable medium storing the image data restoration program, and the image data restoration apparatus that can reduce the burden of image processing and shorten the processing period of time.

(26) An image data restoration method for restoring a blurred image of a subject, includes: setting a one-dimensional direction of blur in the blurred image; computing blur characteristic information, which is expressed by a point spread function indicating spread of an image caused by the blur, based on the set one-dimensional direction; classifying the blur characteristic information by type; determining spread based on coefficients of the point spread function; and performing filter processing with the blur characteristic information in order of spread of the blur characteristic information from largest.

(27) In the image data restoration method of (26), the spread may be defined by a range that occupies more than 80% of a total range representing the point spread function.

(28) In the image data restoration method of (26), the spread may be defined by a standard deviation or variance of the point spread function.

(29) The image data restoration method of any one of (26) to (28) may further include integrating the blur characteristic information for each type of the blur characteristic information. The spread is determined after the integrating.

(30) The image data restoration method of any one of (26) to (28) may further include computing an impulse response of the blur characteristic information. The type of the blur characteristic information may be determined based on the impulse response.

(31) A computer readable medium stores a program that causes a computer to execute a process for restoring a blurred image of a subject. The process includes: setting a one-dimensional direction of blur in the blurred image; computing blur characteristic information, which is expressed by a point spread function indicating spread of an image caused by the blur, based on the set one-dimensional direction; classifying the blur characteristic information by type; determining spread based on coefficients of the point spread function; and performing filter processing with the blur characteristic information in order of spread of the blur characteristic information from largest.

(32) In the computer readable medium of (31), the spread may be defined by a range that occupies more than 80% of a total range representing the point spread function.

(33) In the computer readable medium of (31) the spread may be defined by a standard deviation or variance of the point spread function.

(34) In the computer readable medium of any one of (31) to (33), the process may further include integrating the blur characteristic information for each type of the blur characteristic information. The spread may be determined after the integrating.

(35) In the computer readable medium of any one of (31) to (34), the process may further include computing an impulse response of the blur characteristic information. The type of the blur characteristic information may be determined based on the impulse response.

(36) An image data restoration apparatus for restoring a blurred image of a subject includes a computing unit, a classifying unit, a determining unit and a filtering unit. The computing unit sets a one-dimensional direction of blur in the blurred image. The computing unit computes blur characteristic information, which is expressed by a point spread function indicating spread of an image caused by the blur, based on the set one-dimensional direction. The classifying unit classifies the blur characteristic information by type. The determining unit determines spread based on coefficients of the point spread function. The filtering unit performs filter processing with the blur characteristic information in order of spread of the blur characteristic information from largest.

(37) In the image data restoration apparatus of (36), the spread may be defined by a range that occupies more than 80% of a total range representing the point spread function.

(38) In the image data restoration apparatus of (36), the spread may be defined by a standard deviation or variance of the point spread function.

(39) In the image data restoration apparatus of any one of (36) to (38) the determining unit may integrate the blur characteristic information for each type of the blur characteristic information and then determines the spread.

(40) In the image data restoration apparatus of any one of (36) to (39), the classifying unit may compute an impulse response of the blur characteristic information and then, determine the type of the blur characteristic information based on the impulse response.

The above configuration discriminates a type of blur characteristic information using the blur characteristic information which is expressed by a point spread function indicating spread of an image caused by the blur and discriminates the effect of blur characteristic information for every type. Therefore, the spread of the point spread function of each blur characteristic information is determined. A blurred image is a transfer from the original image. Then, the above configuration computes, from coefficient values of the point spread function, as to how many pixels of the original image a pixel affecting the blur of the blurred image is transferred from. Thus, the blurred image can be processed with a suitable filter. Also, by performing filter processing with the blur characteristic information in order of effect of the filter processing from the highest, the number of times of processing can be reduced and the processing period of time and the processing burden can be reduced.

According to the configuration of any of (26) to (40), there can be provided an image data restoration method, a computer readable medium storing an image data restoration program, and an image data restoration apparatus capable of reducing the burden of image processing and shortening the processing period of time.

(41) An image data restoration method for restoring a blurred image of a subject, includes: setting a one-dimensional direction of blur in the blurred image; computing blur characteristic information, which is expressed by a point spread function indicating spread of an image caused by the blur, based on the set one-dimensional direction; classifying the blur characteristic information by type; determining an influence degree of each classified blur characteristic information.

(42) In the image data restoration method of (41) the influence degree may indicate a susceptibility to an error during correction of the blurred image.

(43) In the image data restoration method of (41), the influence degree may indicate an effect when the blurred image is restored.

(44) The image data restoration method of (42) may further include performing filter processing with the blur characteristic in order of the influence degree of the blur characteristic information from largest.

(45) In the image data restoration method of any one of (41) to (44), the point spread function may be expressed by a polynomial of a predetermined variable representing pixel position information. The influence degree may be determined on the basis of number of terms included in an inverse function of the point spread function.

(46) The image data restoration method of any one of (41) to (45) may further include computing an impulse response of the blur characteristic information. The classifying may classify the blur characteristic information by type based on the impulse response.

(47) A computer readable medium stores a program that causes a computer to execute a process for restoring a blurred image of a subject. The process includes: setting a one-dimensional direction of blur in the blurred image; computing blur characteristic information, which is expressed by a point spread function indicating spread of an image caused by the blur, based on the set one-dimensional direction; classifying the blur characteristic information by type; and determining an influence degree of each classified blur characteristic information.

(48) In the computer readable medium of (47) the influence degree may indicate a susceptibility to an error during correction of the blurred image.

(49) In the computer readable medium of (47), the influence degree may indicate an effect when the blurred image is restored.

(50) In the computer readable medium of (48), the process may further include performing filter processing with the blur characteristic in order of the influence degree of the blur characteristic information from largest.

(51) In the computer readable medium of any one of (47) to (50), the point spread function may be expressed by a polynomial of a predetermined variable representing pixel position information. The influence degree may be determined on the basis of number of terms included in an inverse function of the point spread function.

(52) In the computer readable medium of any one of (47) to (52), the process may further include computing an impulse response of the blur characteristic information. The classifying may classify the blur characteristic information by type based on the impulse response.

(53) An image data restoration apparatus for restoring a blurred image of a subject includes a computing unit, a classifying unit and a determining unit.

The computing unit sets a one-dimensional direction of blur in the blurred image. The computing unit computes blur characteristic information, which is expressed by a point spread function indicating spread of an image caused by the blur, based on the set one-dimensional direction. The classifying unit classifies the blur characteristic information by type. The determining unit determines an influence degree of each classified blur characteristic information.

(54) In the image data restoration apparatus of (53), the influence degree may indicate a susceptibility to an error during correction of the blurred image.

(55) In the image data restoration apparatus of (53), the influence degree may indicate an effect when the blurred image is restored.

(56) The image data restoration apparatus of (54) may further include a filtering unit that performs filter processing with the blur characteristic in order of the influence degree of the blur characteristic information from largest.

(57) In the image data restoration apparatus any one of (53) to (56), the point spread function may be expressed by a polynomial of a predetermined variable representing pixel position information. The determining unit may determine the influence degree on the basis of number of terms included in an inverse function of the point spread function.

(58) In the image data restoration apparatus of any one of (53) to (57), the classifying unit may compute an impulse response of the blur characteristic information, and classifies the blur characteristic information by type based on the impulse response.

The image data restoration method set forth above determines the influence degree after classifying filter by type while using blur characteristic information which is expressed by a point spread function indicating spread of an image caused by the blur. For example, the influence degree is a susceptibility to an error during correction of the blurred image or an effect when the blurred image is restored. When the influence degree is the susceptibility to an error during the correction of the blurred image, the influence of error upon the filter processing is large if the influence degree of the blur characteristic information is high. Therefore, the filter processing is first performed for blur characteristic information whose influence degree is high rather than blur characteristic information whose influence degree is low. Since the determined influence degree is referenced when the order of filter processing is determined, the filter processing can be suitably performed based on each classified blur characteristic information while suppressing the influence of error. By the performing filter processing by referencing the influence degree, the burden of image processing can be reduced and the processing period of time can be reduced.

According to the configuration of any one of (40) to (58), there can be provided an image data restoration method, a computer readable medium storing an image data restoration program, and an image data restoration apparatus capable of reducing the burden of image processing and shortening the processing period of time.

BRIEF DESCRIPTION OF THE DRAWINGS

FIG. 5(a) is a view showing an example of a blur matrix when an imaging element is blurred at a constant velocity in a one-dimensional direction, FIG. 5(b) is a view showing an approximate matrix computed by approximating the blur matrix of FIG. 5(a), FIG. 5(c) is a view showing a recovery matrix which is an inverse matrix of the approximate matrix of FIG. 5(b), and FIG. 5(d) is a view showing a matrix obtained from a product of the blur matrix of FIG. 5(a) and the recovery matrix of FIG. 5(c).

FIG. 6(a) is a view showing an example of a blur matrix when an imaging element is blurred at a constant velocity in a one-dimensional direction, FIG. 6(b) is a view showing an approximate matrix computed by approximating the blur matrix of FIG. 6(a), FIG. 6(c) is a view showing a recovery matrix which is an inverse matrix of the approximate matrix of FIG. 6(b), and FIG. 6(d) is a view showing a matrix obtained from a product of the blur matrix of FIG. 6(a) and the recovery matrix of FIG. 6(c).

FIG. 7(a) is a view showing an example of an approximate matrix when an extrapolation operation is carried out by the difference equation of first order, FIG. 7(b) is a view showing a recovery matrix which is an inverse matrix of the approximate matrix of FIG. 7(a)0., FIG. 7(c) is a view showing a matrix obtained from a product of the blur matrix of FIG. 5(a) and the recovery matrix of FIG. 7(b).

FIG. 8(a) is a view showing an example of an approximate matrix when an extrapolation operation is carried out by the difference equation of a second order, FIG. 8(b) is a view showing a recovery matrix which is an inverse matrix of the approximate matrix of FIG. 8(a), FIG. 8(c) is a view showing a matrix obtained from a product of the blur matrix of FIG. 5(a) and the recovery matrix of FIG. 8(b).

FIG. 17 is a table showing a correspondence relation among a filter type, an influence degree, and filter processing.

DETAILED DESCRIPTION OF EMBODIMENTS OF THE INVENTION

First Embodiment

Hereinafter, embodiments of the invention will be described with reference to the accompanying drawings.

Figure 1:
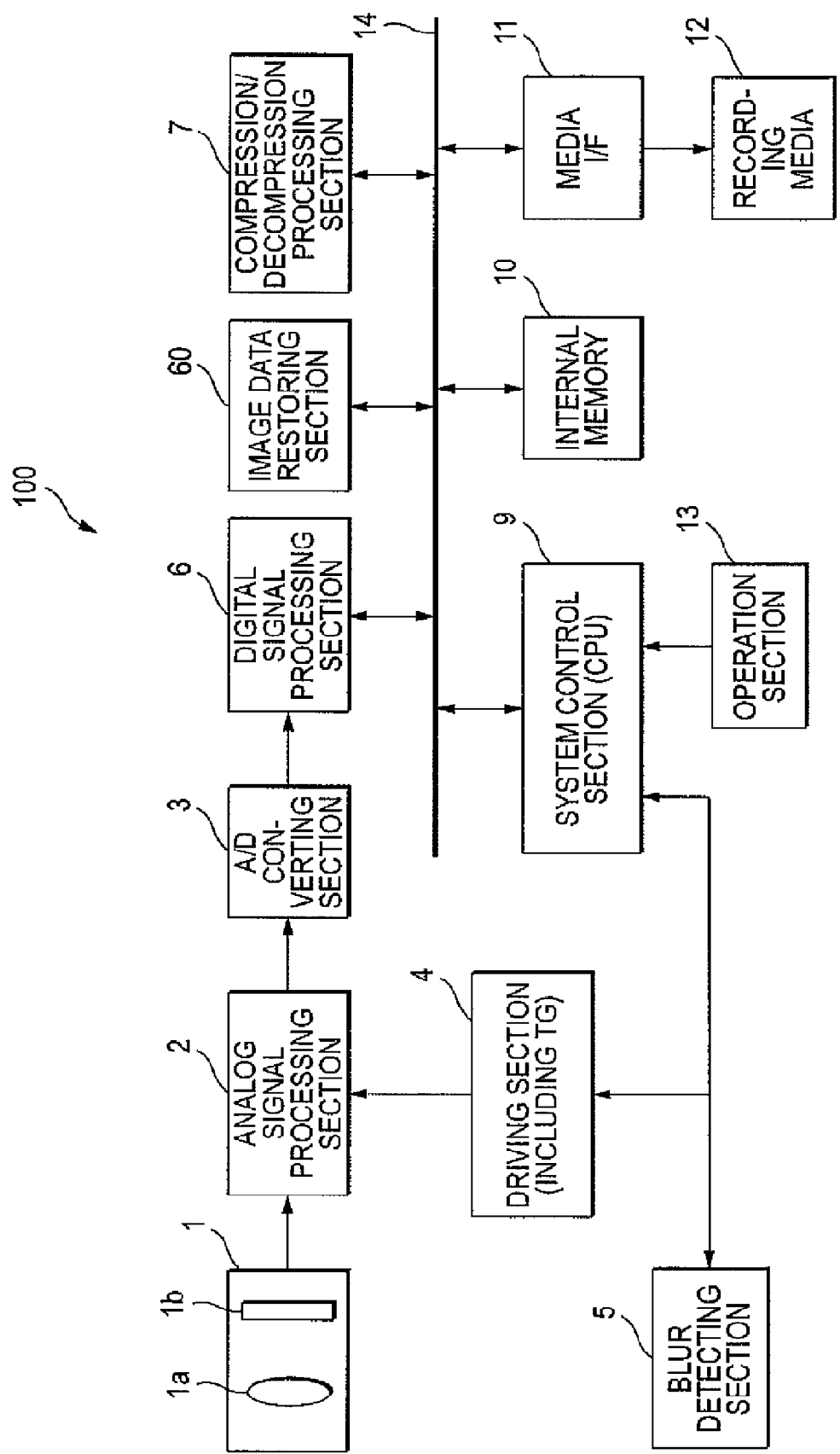
FIG. 1 is a view showing a schematic configuration of a digital camera having a function for correcting blur due to hand movement for illustrating embodiments of the invention.

FIG. 1 shows a schematic configuration of a digital camera having a function for correcting blur due to hand movement which is an example of an imaging apparatus, for illustrating an embodiment of the invention.

As shown in FIG. 1, a digital camera 100 includes an imaging section 1, an analog signal processing section 2, an analog to digital (A/D) converting section 3, a driving section 4, a blur detecting section 5, a digital signal processing section 6, a compression/decompression processing section 7, a system control section 9, an internal memory 10, a media interface (I/F) 11, a recording medium 12, an operation section 13, an image data restoring section 60, and a system bus 14.

The system bus 14 is connected to the image data restoring section 60, the digital signal processing section 6, the compression/decompression processing section 7, the system control section 9, the internal memory 10, and the medium interface 11.

The imaging section 1 includes an optical system having an imaging lens 1a and an imaging element 1b, such as a charge coupled device (CCD) type or a complementary metal oxide semiconductor (CMOS) type imaging (area) sensor, that receives light from a subject through the optical system. The imaging section 1 captures a subject image and outputs an imaging signal (or analog signal).

The analog signal processing section 2 performs a predefined analog signal processing on the imaging signal from the imaging section 1. The A/D converting section 3 converts the analog signal on which the signal processing has been performed in the analog signal processing section 2.

When the digital camera 100 is set to a shooting mode, the driving section 4 drives the imaging element 1b, the analog signal processing section 2, and the A/D converting section 3 in accordance with a drive pulse supplied from the system control section 9. Here, the shooting mode is a mode in which the subject can be captured and image data generated from the imaging signal obtained by shooting can be recorded.

The digital signal processing section 6 performs a digital signal processing on a digital signal from the A/D converting section 3 in accordance with an operating mode set in the operation section 13 and generates captured image data. The digital signal processing in the digital signal processing section 6 includes black level correction processing (OB processing), linear matrix correction processing, white balance adjustment processing, gamma correction processing, concurrent processing, and the like. This digital signal processing section 6 is implemented with, for example, a digital signal processor (DSP). The captured image data generated by the digital signal processing section 6 is temporarily stored in the internal memory 10.

The compression/decompression processing section 7 performs compression processing for the captured image data generated by the digital signal processing section 6 and performs decompression processing for compressed image data obtained from the recording medium 12.

The internal memory 10 is, for example, a dynamic random access memory (DRAM). The internal memory 10 is used as a work memory of the digital signal processing section 6, the system control section 9 and the image data restoring section 60, and is also used as a buffer memory for temporarily storing the captured image data to be recorded in the recording medium 12.

The medium interface 11 performs data input/output with the recording medium 12 such as a memory card. The operation section 13 is used to perform various types of operations for the digital camera, and includes a release button (not shown) for instructing shooting.

The blur detecting section 5 detects blur of the digital camera 100 (having the same meaning as blur of the imaging element 1b) during image capturing (exposure) of the imaging element 1b in accordance with a command from the system control section 9, generates blur information regarding the detected blur, and outputs the blur information to the system control section 9. Along with the captured image data which is acquired upon image capturing during which the blur information is generated, the blur information is recorded in the internal memory 10 by the system control section 9. A method for detecting blur may be implemented by a method for detecting blur by means of a sensor such as a gyroscope or a piezoelectric device; or a method for detecting blur by image processing from image data acquired through exposure. The method for detecting blur by the image processing may be implemented by a method for obtaining blur from a blur direction of a contour or a method for detecting blur from the blur of a specific mark by inserting the specific mark into a part of the subject and shooting the subject. Since all of these blur detecting methods as described above are well known, description thereon will be omitted here.

The blur information can be handled by digital signal processing if a blur position is quantized in pixel-interval unit and an intensity of light in the blur position is quantized. If the blur occurs at a constant velocity in a one-dimensional direction, this means that there is no light intensity difference in a range where the blur occurs. Thus, the blur information can have a uniform intensity.

For example, the blur information generated by the blur detecting section 5 includes a blur direction, a blur size expressed by number of pixels (corresponding to number of photoelectric converting elements of the imaging element 1b), and a blur velocity.

The system control section 9 performs the overall control of the digital camera 100 including a shooting operation.

On the basis of (i) captured image data (hereinafter, referred to as "still image data"), which is acquired upon capturing a still image and which is generated by the digital signal processing section 6 and (ii) the blur information detected and generated by the blur detecting section 5 upon capturing in which the still image data is acquired, the image data restoring section 60 restores the still image data, to thereby recover the still image data which is to be acquired by capturing in a state where there is no blur.

Figure 2:
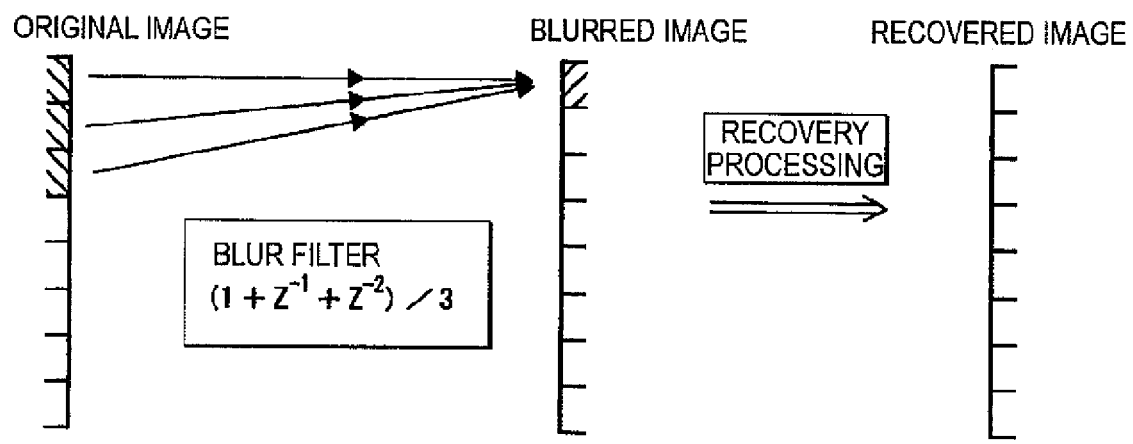
FIG. 2 is a view schematically illustrating recovery of a blurred image.

FIG. 2 is a view schematically illustrating recovery of still image data in which blur occurs. When an original image is expressed so as to correspond to a pixel arrangement of the imaging element 1b for capturing a subject image, light from a plurality of pixels (e.g., three pixels in FIG. 2) among pixels constituting the original image is received in one pixel of the captured image. As a result, blur occurs in the concerned pixel. Since the light of the three pixels of the original image is received in one of the pixels constituting the captured image in FIG. 2, it can be considered that the blur of the three pixels occurs in a vertical direction of the drawing. In FIG. 2, the vertical direction of the drawing is defined as a direction in which the blur occurs. In restoring still image data in which a blur occurs in this embodiment, a blur direction is set to a predetermined one-dimensional direction and processing which will be described later is performed based on blur information in the one-dimensional direction.

In this embodiment, blur characteristic information expressed by a point spread function spread of an image caused by blur is computed based on the one-dimensional direction of the blur for still image data in which the blur occurs. Ideal still image data in which there is no blur is recovered by performing recovery processing that filters the still image data in which the blur occurs using the concerned blur characteristic information as a blur filter.

Now, a method for restoring still image data in which blur occurs will be described.

Figure 3A:
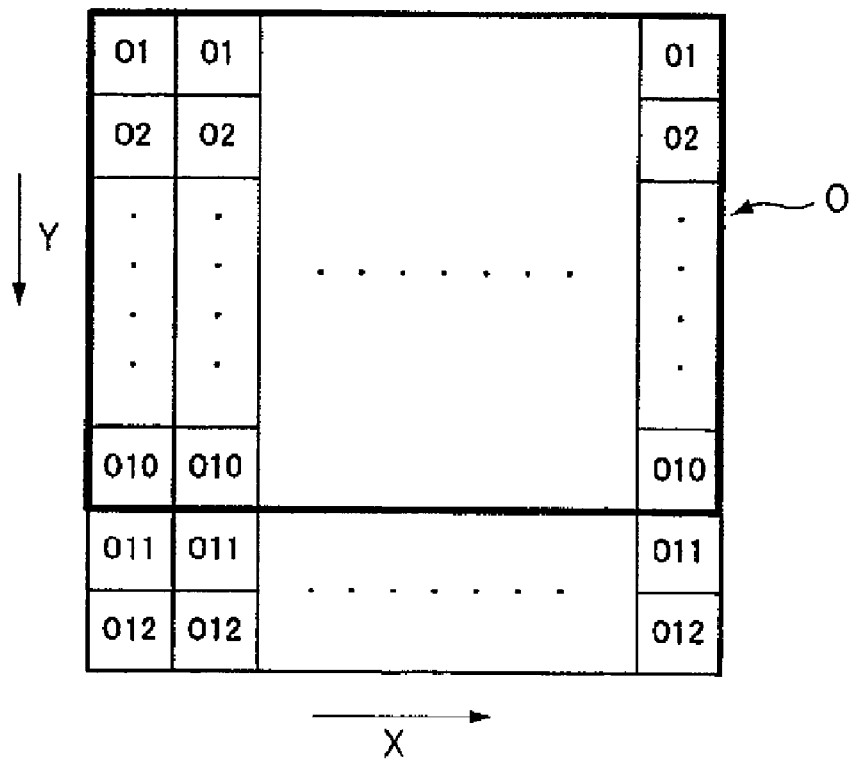
FIG. 3 is a view illustrating a method for restoring still image data in which blur occurs.

FIG. 3(a) is a schematic view of ideal still image data O, in which there is no blur, generated by the digital signal processing section 6 when the imaging element 1b captures a subject image in a state where there is no blur. In the still image data O, a plurality of pixel data columns each including 10 pieces of pixel data, that is, pixel data O1 to O10 arranged in order in a vertical direction Y are arranged in a horizontal direction X orthogonal to the vertical direction Y. Alternatively, in the still image data O, 10 pixel data rows each including plural pieces of pixel data arranged in the horizontal direction X are arranged in the vertical direction Y.

In FIG. 3(a), shown as pixel data O11 and O12 are pixel data of two pixel data rows acquired from a subject that newly enters a shooting range of the imaging element 1b when the imaging element 1b is moved a distance corresponding to two photoelectric converting elements in the Y direction during image capturing. The pixel data O11 and O12 represent pixel data that spread to a outer side in the Y direction than an end portion of the ideal still image data O (the pixel data O10) due to movement of the imaging element 1b. A matrix expression, in which the pixel data columns shown in FIG. 3(a) are combined with the pixel data O11 and the pixel data O12 continued to the outer side in the Y direction, can be defined as a column vector [O] as follows.

$$[O] = \begin{bmatrix} O1 \\ O2 \\ \vdots \\ O12 \end{bmatrix} \quad (1)$$

Figure 3B:
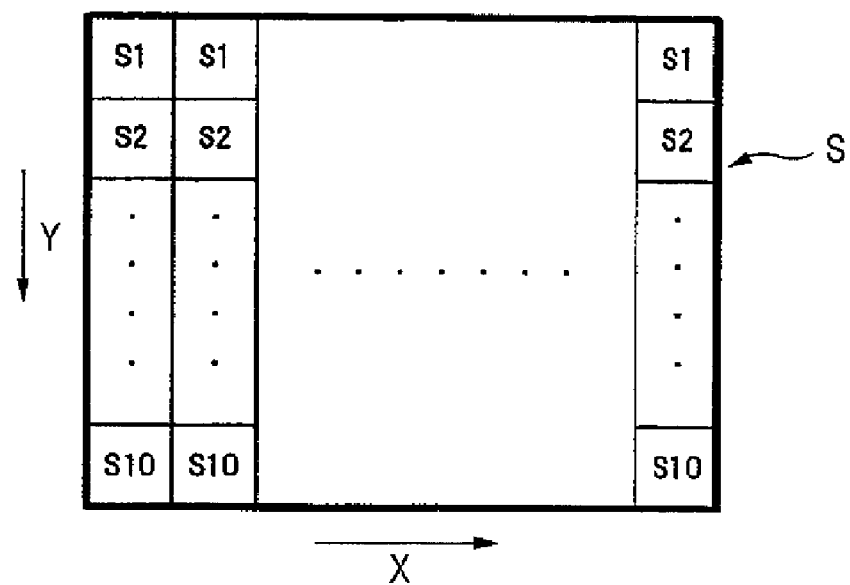

On the other hand, FIG. 3(b) is a schematic view of still image data S generated by the digital signal processing section 6 when a subject image is captured in a shaken state while the imaging element 1b is intended to perform the image capturing to acquire the still image data O. In the still image data S, a plurality of pixel data columns each including 10 pieces of pixel data, that is, pixel data S1 to S10 arranged in order in the vertical direction Y are arranged in the horizontal direction X orthogonal to the vertical direction Y. Alternatively, in the still image data S, 10 pixel data rows each including a plurality of pixel data arranged in the horizontal direction X may be arranged in the vertical direction Y. Each pixel data column of the still image data S can be expressed as a column vector [S] as follows.

$$[S] = \begin{bmatrix} S1 \\ S2 \\ \vdots \\ S10 \end{bmatrix} \quad (2)$$

Herein, it is assumed that the imaging element 1b is moved a distance corresponding to two photoelectric converting elements in the Y direction upon image capturing when the still image data S is being captured. Also, it is assumed that H denotes a blur matrix corresponding to a point spread function (hereinafter, referred to as a blur transfer function) which represents spread of the still image data O in the Y direction caused by this blur and which is expressed in a z region. Here, the following relation is established.

$$\begin{bmatrix} S1 \\ S2 \\ \vdots \\ S10 \end{bmatrix} = H \times \begin{bmatrix} O1 \\ O2 \\ \vdots \\ O12 \end{bmatrix} \quad (3)$$

Since what is finally to be obtained is the ideal still image data O in which there is no blur, an arithmetic operation as shown in the following expression (4) is required to recover the still image data O. In the expression (4), W denotes an inverse matrix of the blur matrix H.

$$\begin{bmatrix} O1 \\ O2 \\ \vdots \\ O10 \end{bmatrix} = W \times \begin{bmatrix} S1 \\ S2 \\ \vdots \\ S10 \end{bmatrix} \quad (4)$$

As can be seen from the expression (3), the blur matrix H becomes a matrix of 10 rows×12 columns and is not regular because the number of pieces of data of [S] is different from that of [O]. For this reason, an inverse matrix of the blur matrix H cannot be computed. Then, a pseudo inverse matrix of the blur matrix H is obtained and set to W, to thereby make it possible to obtain values of [O]. By performing this processing and by recovering data of each pixel image column of the still image data O, still image data in which there is no blur can be acquired. Hereinafter, the recovered still image data O may also be referred to as "recovered image data O." Hereinafter, W is referred to as a "recovery matrix" because W is the matrix for recovering the still image data O.

The image data restoring section 60 provided in the digital camera of this embodiment has a function for effectively eliminating noise superimposed on the recovered image data O by generating the recovered image data O using the recovery matrix W.

In the following description, it is assumed that still image data generated by the digital signal processing section 6 is one shown in FIG. 3(b) and that still image data recovered by the image data restoring section 60 is one shown in FIG. 3(a).

Figure 4:
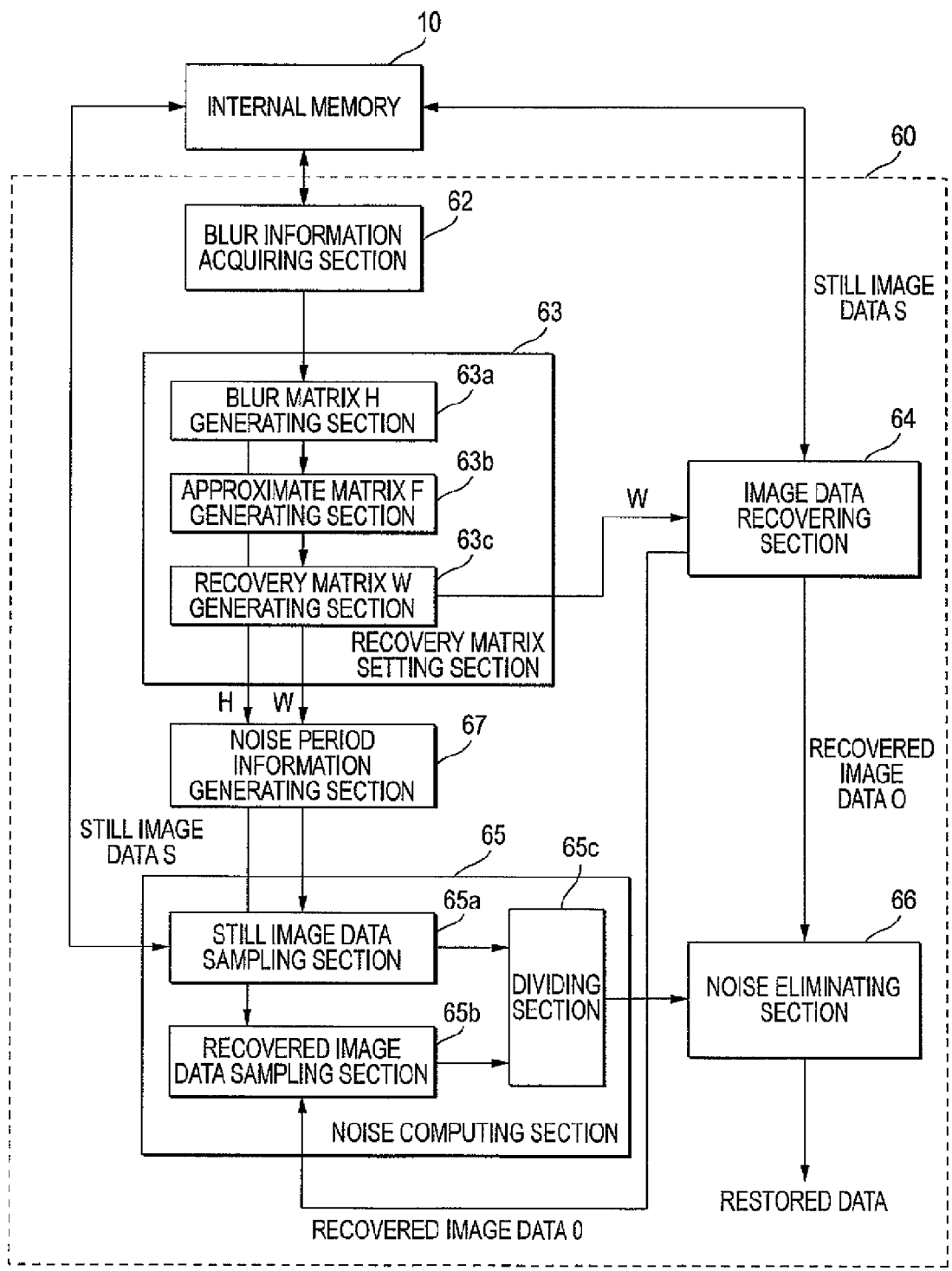
FIG. 4 is a block diagram showing the internal configuration of an image data restoring section shown in FIG. 1.

FIG. 4 is a block diagram showing an internal configuration of the image data restoring section 60 shown in FIG. 1.

The image data restoring section 60 is provided with a blur information acquiring section 62 for acquiring blur information (hereinafter, denoted by "A") from the internal memory 10; a recovery matrix setting section 63 for setting a recovery matrix W on the basis of the blur information A; an image data recovering section 64 for recovering the ideal image data O by multiplying the recovery matrix W set by the recovery matrix setting section 63 and the still image data S corresponding to the blur information A recorded in the internal memory 10; a noise period information generating section 67 for generating noise period information regarding a superimposition period and a type of noise which derives from the recovery matrix W and which is periodically superimposed in the Y direction on each pixel data column of the recovered image data O recovered by the image data recovering section 64 set in the recovery matrix setting section 63; a noise computing section 65 for computing the concerned noise; and a noise eliminating section 66 for eliminating the computed noise from the recovered image data O recovered by the image data recovering section 64.

The recovery matrix setting section 63 is provided with a blur matrix generating section 63a for generating the blur matrix H on the basis of the blur information A, an approximate matrix generating section 63b for generating an approximate matrix F from the blur matrix H generated by the blur matrix generating section 63a, and a recovery matrix generating section 63c for generating the recovery matrix W by computing an inverse matrix of the approximate matrix F generated by the approximate matrix generating section 63b. The recovery matrix setting section 63 sets the recovery matrix W generated by the recovery matrix generating section 63c.

The image data recovering section 64 recovers the still image data O constituted by the plurality of pixel data columns by multiplying the recovery matrix W set by the recovery matrix setting section 63 and each pixel data column [S] of the still image data S recorded by the internal memory 10.

The blur matrix generating section 63a generates a blur transfer function expressed in the z region from the blur direction, the blur size and the blur velocity, which are based on the blur information A, and generates the blur matrix H by transforming the blur transfer function into a matrix.

Figure 18:
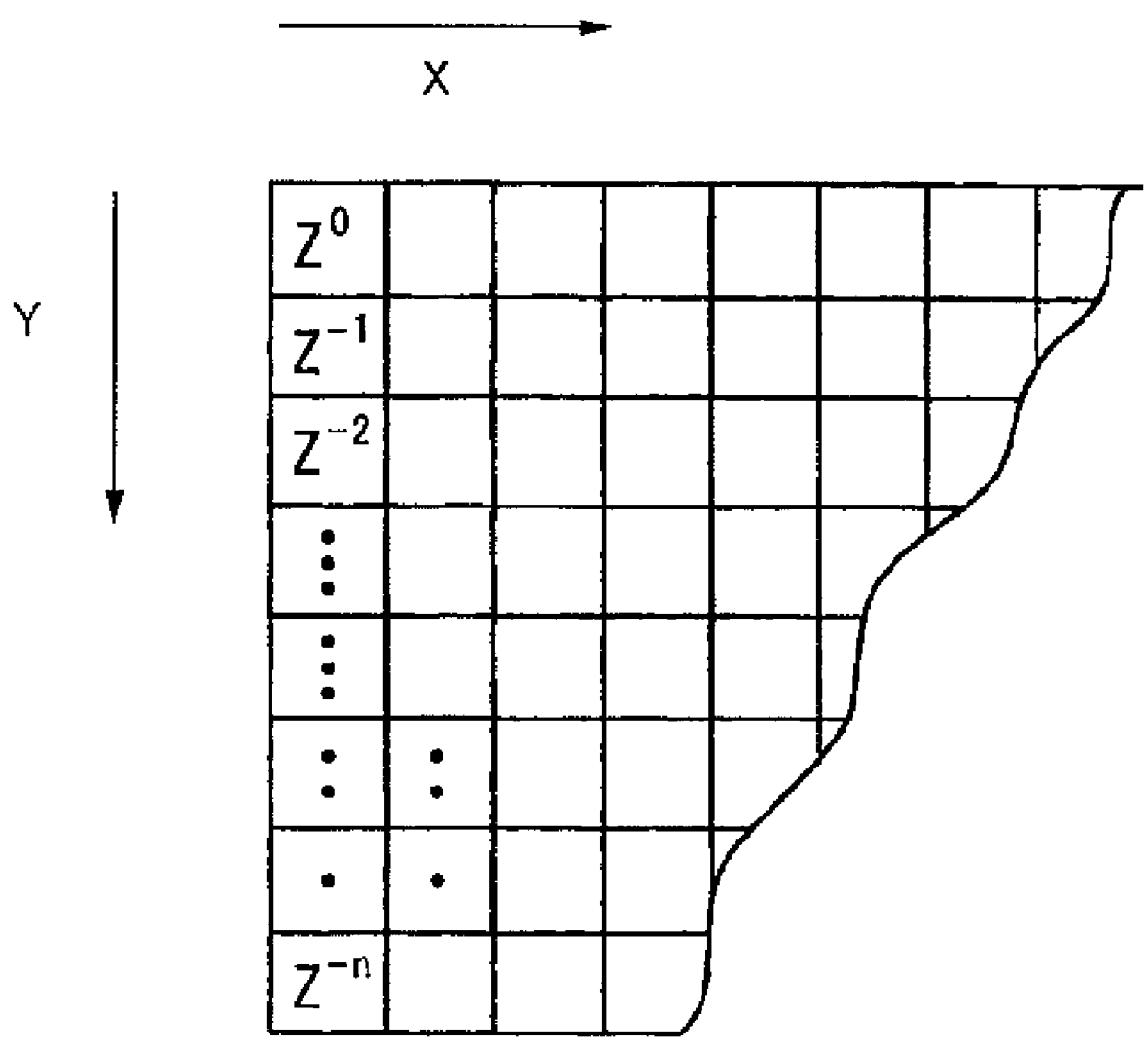
FIG. 18 is a plan view of a blurred image

FIG. 18 is a plan view of a blurred image. In FIG. 18, an attention is given to a desired pixel $Z^0$ in the blurred image and the one-dimensional direction of the blur is the Y direction. In this case, it is assumed that $Z^{-1}$ denotes blur, in the pixel $Z^0$, corresponding to one photoelectric converting element and that $Z^{-2}$ denotes blur, in the pixel $Z^0$, corresponding to two photoelectric converting elements.

For example, if the blur direction is the Y direction, the blur size is a distance corresponding to two photoelectric converting elements, and the blur velocity is a constant velocity, the blur transfer function H(z) is expressed by $\{(1+Z^{-1}+Z^{-2})/3\}$. Its matrix expression is shown in FIG. 5(a).

In order to generate the regular blur matrix H, the approximate matrix generating section 63b generates the approximate matrix F which is defined so as to extrapolate a value equal to the pixel data O10 into values of pixel data (pixel data O11 and O12 in FIG. 3(a)) which are located on an outer side than an end portion of the ideal still image data O and which are generated by the spread of the ideal still image data O due to blur based on the blur information A. When the blur matrix H is formed as shown in FIG. 5(a), the approximate matrix generating section 63b generates the approximate matrix F as shown in FIG. 5(b) by eliminating two columns from the rightmost of the blur matrix H and adding "1" and "2" to a value of the bottommost row of the rightmost column of the matrix after the elimination and a value of its upper row, respectively.

When the approximate matrix F is formed as shown in FIG. 5(b), the recovery matrix W generated by the recovery matrix generating section 63c becomes one shown in FIG. 5(c).

Since the recovery matrix W is uniquely determined if the blur information is determined, recovery matrices W corresponding to various estimated blur information may be computed in another computer. The recovery matrices W may be recorded in advance in a read only memory (ROM) or the like inside the digital camera. When shooting is performed, the recovery matrix setting section 63 may read a recovery matrix W corresponding to the blur information at that time from ROM and set the read recovery matrix W.

A product W×H, which is a product of the blur matrix H shown in FIG. 5(a) and the recovery matrix W shown in FIG. 5(c), becomes a matrix shown in FIG. 5(d). Since the recovery matrix W is computed as the inverse matrix of the blur matrix H, it is ideal that data of the bottommost row of the third column from the right among data of three columns from the right of the matrix shown in FIG. 5(d) is set to "1" and that the other data are set to "0." However, since the recovery matrix W is the pseudo inverse matrix of the blur matrix H, values of W×H are not ideal. Thus, noise superimposed on the recovered image data O acquired by recovery using the recovery matrix W can be detected by comparing the ideal values of W×H with the actual values of W×H.

From the matrix of W×H shown in FIG. 5(d), it can be found that the same noise (1) is added to the first, fourth and seventh rows, the same noise (2) is added to the second, fifth and eighth rows, the same noise (3) is added to the third, sixth and ninth rows, and data of the tenth row is incorrect. From this fact, it can be detected that in the recovered image data O recovered using the recovery matrix W, the noise (1) is added in a $\{3(n-1)+1\}$ row period, the noise (2) is added in a $\{3(n-1)+2\}$ row period and the noise (3) is added in a $\{3(n-1)+3\}$ row period, where n is 1 to 3. Also, it can be detected that in the recovered image data O recovered using the recovery matrix W, the data of the tenth row is incorrect.

Using this results, the noise period information generating section 67 computes a product of the blur matrix H generated by the blur matrix generating section 63a and the recovery matrix W generated by the recovery matrix generating section 63c, detects a noise type ((1)~(3)) as described above from the matrix acquired from this product, and generates noise period information indicating a noise superimposition period of each noise type.

If the noise superimposition period of each noise type is found, a noise value of each noise type can be estimated. For example, if the noise superimposition period is detected from the matrix shown in FIG. 5(d), a sum Σ1 of pixel data obtained by sampling pixel data in every $\{3(n-1)+1\}$ row(s) with respect to one pixel data column (hereinafter, denoted by "B") of the recovered image data O is as follows.

$$\Sigma 1 = (\text{Pixel Data } O1) + (\text{Pixel Data } O4) + (\text{Pixel Data } O7) + (3 \times \text{Noise}(1)) \tag{5}$$

Since a value of "Pixel Data O1+Pixel Data O4+Pixel Data O7" is not greatly different from "Pixel Data S1+Pixel Data S4+Pixel Data S7", it is possible to approximate by this value.

In other words, the expression (5) can be approximated by expression (6)

$$\Sigma1 = (\text{Pixel Data } S1) + (\text{Pixel Data } S4) + (\text{Pixel Data } S7) + (3 \times \text{Noise}(1)) \quad (6)$$

Since Σ1 and pixel data S1, S4 and S7 are known, a value of the noise (1) can be computed by the following Expression (7) into which Expression (6) is transformed.

$$\text{Noise}(1) = \{\Sigma1 - ((\text{Pixel Data } S1) + (\text{Pixel Data } S4) + (\text{Pixel Data } S7))\}/3 \quad (7)$$

Similarly, a sum Σ2 of pixel data acquired when the pixel data is sampled in every {3(n−1)+2} rows with respect to the pixel data column B, is given by expression (8).

$$\Sigma2 = (\text{Pixel Data } O2) + (\text{Pixel Data } O5) + (\text{Pixel Data } O8) + (3 \times \text{Noise}(2)) \quad (8)$$

Expression (8) can be approximated by the following expression (9).

$$\Sigma2 = (\text{Pixel Data } S2) + (\text{Pixel Data } S5) + (\text{Pixel Data } S8) + (3 * \text{Noise}(2)) \quad (9)$$

According to the following Expression (10) obtained by transforming expression (9), a value of the noise (2) can be computed.

$$\text{Noise}(2) = \{\Sigma2 - ((\text{Pixel Data } S2) + (\text{Pixel Data } S5) + (\text{Pixel Data } S8))\}/3 \quad (10)$$

Similarly, a sum Σ3 of pixel data acquired when the pixel data is sampled in every {3(n−1)+3} rows with respect to the pixel data column B, is given by expression (11).

$$\Sigma3 = (\text{Pixel Data } O3) + (\text{Pixel Data } O6) + (\text{Pixel Data } O9) + (3 \times \text{Noise}(3)) \quad (11)$$

Expression (11) can be approximated by the following expression (12).

$$\Sigma3 = (\text{Pixel Data } S3) + (\text{Pixel Data } S6) + (\text{Pixel Data } S9) + (3 \times \text{Noise}(3)) \quad (12)$$

According to the following Expression (13) obtained by transforming expression (12), a value of the noise (3) can be computed.

$$\text{Noise}(3) = \{\Sigma3 - ((\text{Pixel Data } S3) + (\text{Pixel Data } S6) + (\text{Pixel Data } S9))\}/3 \quad (13)$$

According to this processing, the superimposed noises can be computed for every pixel data column constituting the recovered image data O.

In order to perform this processing, the noise computing section 65 is provided with a still image data sampling section 65a, a recovered image data sampling section 65b, and a dividing section 65c.

The still image data sampling section 65a samples each pixel data column [S] of the still image data S recorded in the internal memory 10, in a noise superimposition period of every noise type included in the noise period information.

The recovered image data sampling section 65b samples each pixel data column [O] of the recovered image data O generated by the image data recovering section 64, in the noise superimposition period of every noise type included in the noise period information.

The dividing section 65c subtracts a sum of pixel data (for example, "Pixel Data S1+Pixel Data S4+Pixel Data S7") sampled by the still image data sampling section 65a in the noise superimposition period from a sum (for example, Σ1) of pixel data sampled by the recovered image data sampling section 65b. The dividing section 65c divides a value obtained by the subtraction by the number of times (for example, 3) of sampling in the noise superimposition period and computes a noise value of each type of noise superimposed on each pixel data column [O] of the recovered image data O.

Noise period information used in the noise computing section 65 is uniquely determined if blur information is determined. Therefore, noise period information corresponding to various estimated blur information may be computed in another computer, and the noise period information may be recorded in advance in a ROM inside the digital camera. When shooting is performed, the noise computing section 65 may read noise period information corresponding to the blur information from the ROM and supply the read noise read information to the still image data sampling section 65a and the recovered image data sampling section 65b.

The noise eliminating section 66 eliminates the noises, which are output from the dividing section 65c, from the recovered image data O and records recovered image data after the elimination, for example, in the internal memory 10. After compression processing in the compression/decompression processing section, the recorded recovered image data is recorded in the recording medium 12.

For example, when the noise superimposition period is detected from the matrix shown in FIG. 5(d), the noise eliminating section 66 eliminates the noise (1) computed for each image data column [O] from image data of the {3(n−1)+1}-th row of each image data column [O] of the recovered image data O, eliminates the noise (2) computed for each image data column [O] from image data of the {3(n−1)+2}-th row of each image data column [O] of the recovered image data O, and eliminates the noise (3) computed for each image data column [O] from image data of the {3(n−1)+3}-th row of each image data column [O] of the recovered image data O.

An example in which the imaging element 1b is blurred at a constant velocity has been described above. Alternatively, noise may be similarly eliminated even if the imaging element 1b is blurred (moved) at an inconstant velocity. For example, if the blur direction based on the blur information A is the Y direction, the blur size is a distance corresponds to two photoelectric converting elements and the blur velocity is an inconstant velocity, the blur transfer function H(z) is expressed by $\{(1+Z^{-2})/2\}$. In this case, the matrix expression is given as shown in FIG. 6(a), the approximate matrix F is expressed as shown in FIG. 6(b), the recovery matrix W is expressed as shown in FIG. 6(c), and a product of the recovery matrix W and the recovery matrix H is expressed as shown in FIG. 6(d).

From the matrix of W×H shown in FIG. 6(d), it can be found that the same noise (1) is added to the first, fifth and ninth rows, the same noise (2) is added to the second and sixth rows, the same noise (3) is added to the third and seventh rows, the same noise (4) is added to the fourth and eighth rows, and data of the tenth row is incorrect. From this fact, it can be detected that the noise (1) is added in a {4(n−1)+1} row period (where n=1 to 3), the noise (2) is added in a {4(n−1)+2} row period (where n=1, 2), the noise (3) is added in a {4(n−1)+3} row period (where n=1, 2), the noise (4) is added in a {4(n−1)+4} row period (where n=1, 2), and the data of the tenth row is incorrect, in the recovered image data O recovered using the recovery matrix W.

In the above description, data to be extrapolated has the same value as the pixel data O10 when the approximate matrix F is computed. There is no problem even if a value computed by a difference equation of first order or a difference equation of second order is extrapolated as disclosed in JP Hei.6-118468 A.

Figures 7A, 7B, 7C:
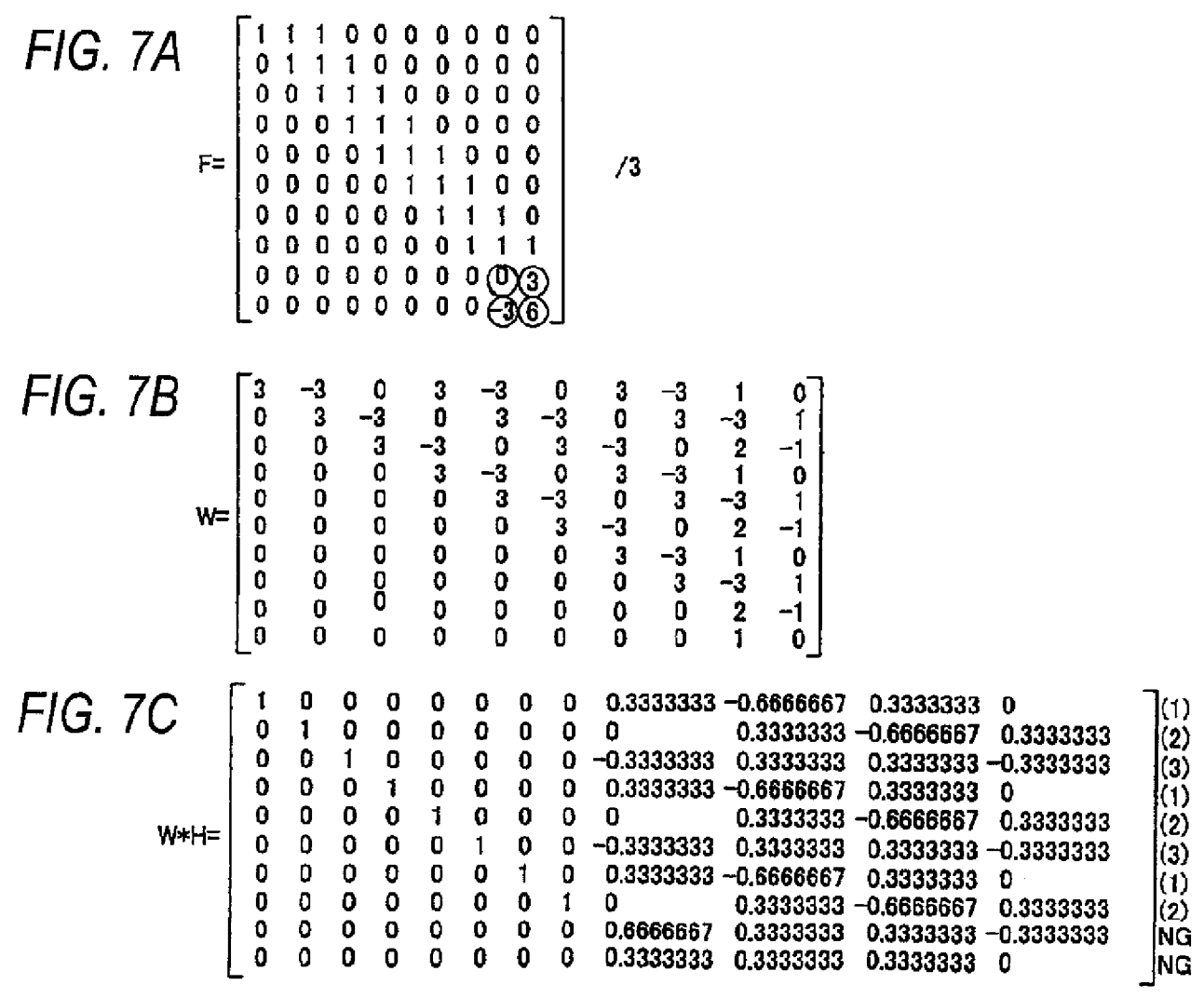

For example, in the case where an extrapolation operation is carried out by the difference equation of first order, if the blur matrix H is one shown in FIG. 5(a), the approximate matrix F is expressed as shown in FIG. 7(a), the recovery matrix W serving as the inverse matrix of the approximate matrix F is expressed as shown in FIG. 7(b), and a product of the blur matrix H and the recovery matrix W is expressed as shown in FIG. 7(c). In the case where an extrapolation operation is carried out by the difference equation of second order, the approximate matrix F is expressed as shown in FIG. 8(a), the recovery matrix W serving as the inverse matrix of the approximate matrix F is expressed as shown in FIG. 8(b), and a product of the blur matrix H and the recovery matrix W is expressed as shown in FIG. 8(c).

From the matrix of W×H shown in each of FIG. 7(c) and FIG. 8(c), it can be found that the same noise (1) is added to the first, fourth and seventh rows, the same noise (2) is added to the second, fifth and eighth rows, the same noise (3) is added to the third and sixth rows, and data of the ninth and tenth rows is incorrect. From this, it can be detected that the noise (1) is added in a {3(n−1)+1} row period (where n=1∼3), the noise (2) is added in a {3(n−1)+2} row period (where n=1∼3), the noise (3) is added in a {3(n−1)+3} row period (where n=1, 2), and the data of the ninth and tenth rows is incorrect, in terms of the recovered image data O recovered using the recovery matrix W of each of FIG. 6(c) and FIG. 7(c).

From FIGS. 7 and 8, it can be found that incorrect data is further incremented by one row in the case where the difference equation of first order or the difference equation of second order is carried out in comparison with the case where data to be extrapolated has the same value as the pixel data O10. To improve the recovery accuracy of the recovered image data O, it is preferable that the data to be extrapolated has the same value as the pixel data O10.

Next, the operation of the image data restoring section 60 will be described.

Figure 9:
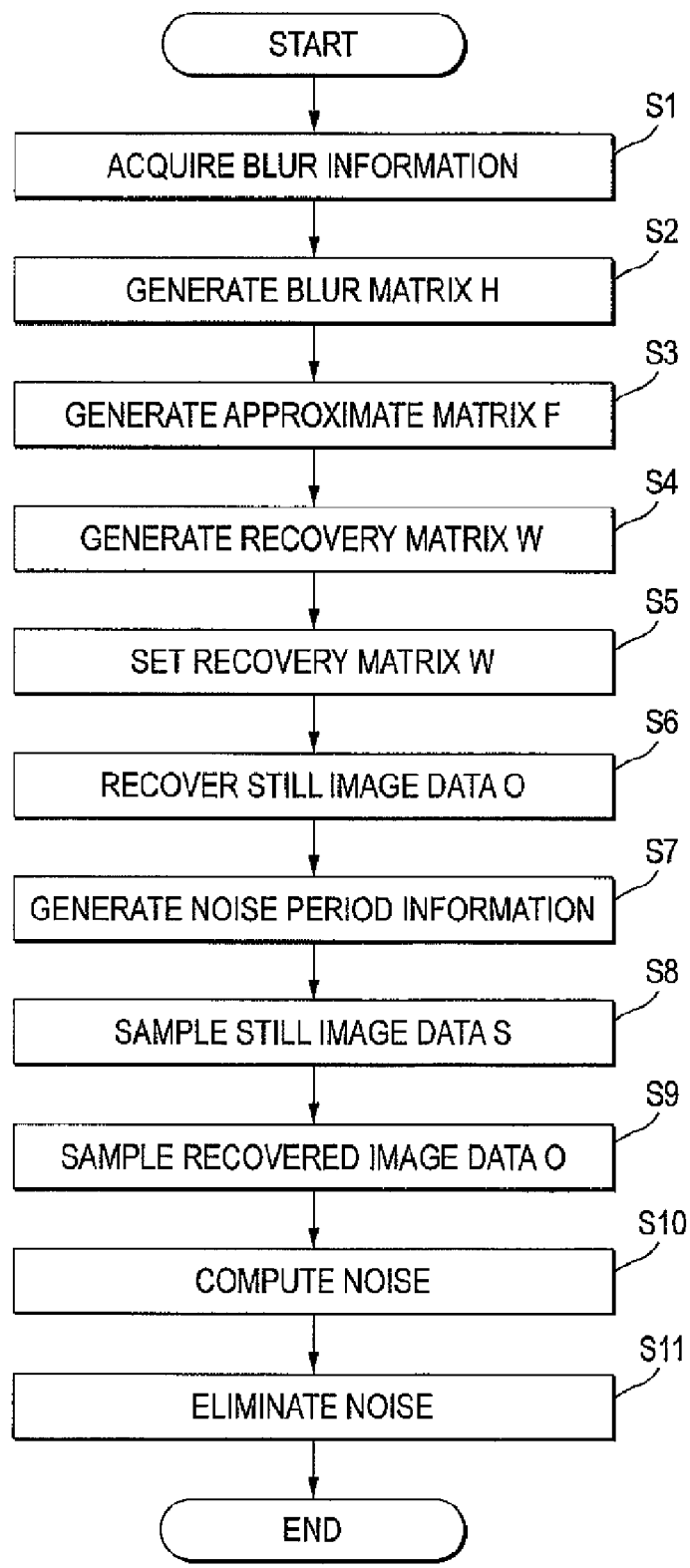
FIG. 9 is a flowchart illustrating an operation of the image data restoring section shown in FIG. 1.

FIG. 9 is a flowchart illustrating the operation of the image data restoring section 60.

First, when the imaging element 1b captures an image, blur information regarding blur (movement) of the imaging element 1b during image capturing is generated. The blur information is recorded in the internal memory 10 in association with still image data S obtained by image capturing.

After the still image data S and the blur information are recorded in the internal memory 10, the image data restoring section 60 acquires the blur information from the internal memory 10 (step S1). Next, the image data restoring section 60 generates a blur matrix H according to the blur information (step S2), generates an approximate matrix F from the blur matrix H (step S3), generates a recovery matrix W from the approximate matrix F (step S4), and sets the recovery matrix W (step S5).

Next, the image data restoring section 60 restores still image data O according to a product of the set recovery matrix W and the still image data S recorded in the internal memory 10 (step S6). The image data restoring section 60 generates noise period information from a product of the blur matrix H generated in step S2 and the recovery matrix W generated in step S4 (step S7).

Next, the image data restoring section 60 samples the still image data S recorded in the internal memory 10 according to the noise period information (step S8), samples the recovered image data O recovered in step S6 according to the noise period information (step S9), and computes noise superimposed on the recovered image data O on the basis of the data sampled in steps S7 and S8 (step S10). Next, the image data restoring section 60 eliminates the noise computed in step S10 from the recovered image data O recovered in step S6 (step S11) and ends image data restoration processing by outputting the recovered image data O to the outside after the elimination.

When the image data restoring section 60 of this embodiment as described above recovers the still image data O using the pseudo inverse matrix W of the blur matrix H, the noise superimposed on the recovered still image data O can be effectively eliminated. As a result, the still image data O in which a blur occurs can be recovered while suppressing image quality from being degraded. It is possible to provide a digital camera having a function for correcting a blur due to hand movement at high reliability.

The image data restoring section 60 of this embodiment as described above can be realized even when a computer such as an arithmetic processing unit or the like mounted in the digital camera (for example, the digital signal processing section 6 or the system control section 9) runs an image data restoration program for enabling the computer to function as each section within the image data restoring section 60 or an image data restoration program for executing each processing step of the image data restoring section 60 as shown in FIG. 9 in the computer. This computer can function as the image data restoring section 60 by recording the still image data S acquired from the digital camera or the like in the internal memory of the personal computer and running the above-described image data restoration program in the computer.

When a computer separated from the digital camera runs the image data restoration program, the computer can be equipped with many memories. As described above, it is preferable to record the recovery matrix W or the noise period information in the memories of various blur information and to read and use the recovery matrix W or the noise period information from the memories when image data restoration processing is performed. Accordingly, image data restoration processing can be performed at a high rate.

Second Embodiment

Next, there will be described an image data restoration method, a computer readable medium storing an image data restoration program and an image data restoration apparatus that can reduce the burden of image processing and shorten the processing period of time when ideal image data O in which blur does not occur is recovered from still image data S in which blur occurs.

It is assumed that a point spread function (may be referred to as a filter or blur characteristic information) which is caused by moving (blurring) of the imaging element 1b in the Y direction during shooting is given by the following expression.

$$H_1(Z) = 1 + 2Z^{-1} \qquad (14)$$

When solutions of S1, S2 and S3 are sequentially computed in Expression (14), the following expressions (15-1) to (15-3) are obtained.

$$S_1 = O_1 + 2O_2 \qquad (15\text{-}1)$$

$$-2S_2 = -2O_2 - 4O_3 \qquad (15\text{-}2)$$

$$4S_3 = 4O_3 + 8O_4 \qquad (15\text{-}3)$$

As shown in Expressions (15-1) to (15-3), coefficients of O increase in a downward direction (Y direction, that is, a direction from S1 toward S3). In this case, when Expressions (15-1) to (15-3), which are computed using the filter expressed by Expression (14), are added, Expression (16) is obtained.

$$O_1 + 8O_4 = S_1 - 2S_2 + 4S_3 \qquad (16)$$

When Expression (14) is solved for S4, S5, ... and S4, S5, ... are similarly added, Expression (17) is obtained.

$$O_1 - (-2)^n O_n = \sum_{i}^{n} (-2)^{i-1} S_i \quad (17)$$

In Expression (17), $(-2)^n$ of the left side does not converge. For this reason, the solution of O1 does not converge.

On the other hand, the solution can converge when an arithmetic operation is carried out in the down-to-up direction (−Y direction) using the filter of Expression (14). When Expression (14) is solved for S10, S9 and S8, Expression (18) is obtained.

$$S_{10} = O_{10} + 2O_{11} \quad (18)$$
$$-\frac{1}{2}S_9 = -\frac{1}{2}O_9 - O_{10}$$
$$\frac{1}{4}S_8 = \frac{1}{4}O_8 + \frac{1}{2}O_9$$

When Expression (18) is added, Expression (19) is obtained.

$$2O_{11} + \frac{1}{4}O_8 = S_{10} - \frac{1}{2}S_9 + \frac{1}{4}S_8 \quad (19)$$

Since coefficients of O decreases in the down-to-up direction in Expression (19), the solution for O11 can converge.

When the computing is performed in the up-to-down direction, some solution may converge depending on filter coefficients. Furthermore, filters may be classified into the following four types of:

(i) a type in which convergence is achieved when an input is given in the up-to-down direction,
(ii) a type in which convergence is achieved when an input is given in the down-to-up direction,
(iii) a type in which there is no convergence direction, and
(iv) a type in which an ideal image coincides with the original image by shifting coordinates.

In this embodiment, types of filters are discriminated, and filter processing is performed in the convergence direction if the convergence direction is present. On the other hand, when there is no convergence direction, performed is image restoration for the case where blur occurs at a constant velocity in a one-dimensional direction as described above.

Next, a procedure of the image recovery method will be described.

Figure 10:
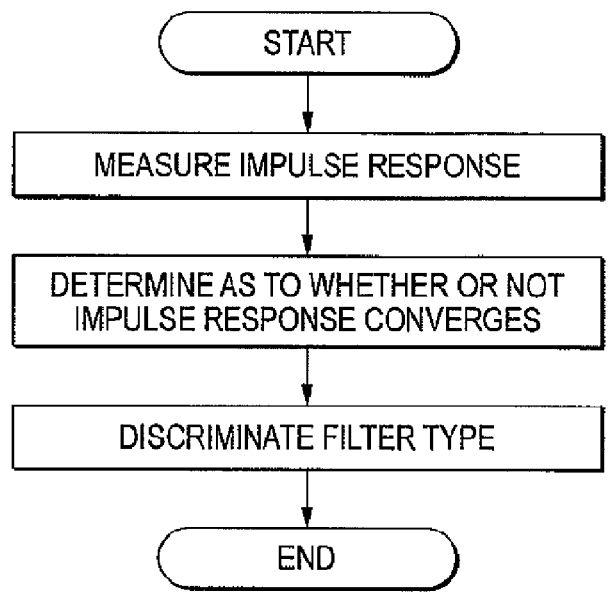
FIG. 10 is a flowchart showing a procedure of image recovery processing.

FIG. 10 is a flowchart showing a procedure of image recovery processing. First, a one-dimensional direction of blur is set in still image data in which the blur has occurred. On the basis of the set one-dimensional direction, computed is blur characteristic information expressed by a point spread function H of the blurred image.

Then, it is determined as to whether or not an impulse response of the computed blur characteristic information converges. According to this determination result, a type of filter is discriminated.

Next, the impulse response according to this embodiment will be described. In the matrix W shown in FIG. 5(c), each row has a predetermined pattern. For example, values of other rows can be determined by determining values of the first row.

A rule in the first row is an impulse response sequence of the recovery matrix W (inverse blur characteristic function).

Figure 11:
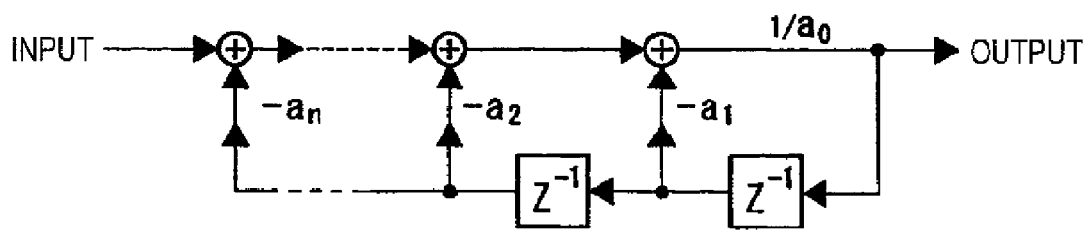
FIG. 11 is a view showing a signal flow of an inverse filter.

A method for deriving an impulse response sequence of 1/H(Z) serving as an inverse blur characteristic can be achieved by inputting a predetermined input value to an inverse filter. FIG. 11 shows a signal flow of the inverse filter. The inverse filter W (=1/H(Z)) can be expressed as shown in the following equation.

$$W = \frac{1}{H} = \frac{1}{\sum_{i=0}^{n} a_i Z^{-i}} \quad (20)$$

The impulse response sequence can be output by setting all initial values of S to 0 and inputting input values (1, 0, 0, 0, 0, ... ).

In this embodiment, the filter type is classified by checking the convergence of the output impulse response sequence.

In a method for classifying a filter type, the filter type may be computed by factorizing a function of blur characteristic information as described below, in place of the method for discriminating the filter type on the basis of the impulse response as described above.

Specifically, a method for factorizing an inverse function of a function representing blur information and discriminating filter processing on the basis of a factorization result may be used.

FIGS. 12 to 15 are flows showing a procedure for classifying a filter by type on the basis of an inverse blur filter.

First, a one-dimensional direction of blur is set in still image data in which the blur has occurred, and blur characteristic information is computed. Then, an inverse blur filter (inverse blur characteristic function) of this blur characteristic information is computed. Here, it is assumed that the inverse blur filter is expressed by the following expression.

$$Wj(Z) = 1/(bj0 + bj1Z^{-1} + bj2Z^{-2}) \quad (21)$$

(where j=1~n, and bj0, bj1 and bj2 are real numbers)

In this embodiment, the inverse blur filter is expressed by a polynomial of a predetermined variable representing pixel position information. After determining as to whether or not a coefficient of each term of the polynomial is equal to 0, a magnitude relation between the coefficients of the terms of the polynomial is detected and blur characteristic information (or blur filter) is classified by type. This will be described below in detail.

Figure 12:
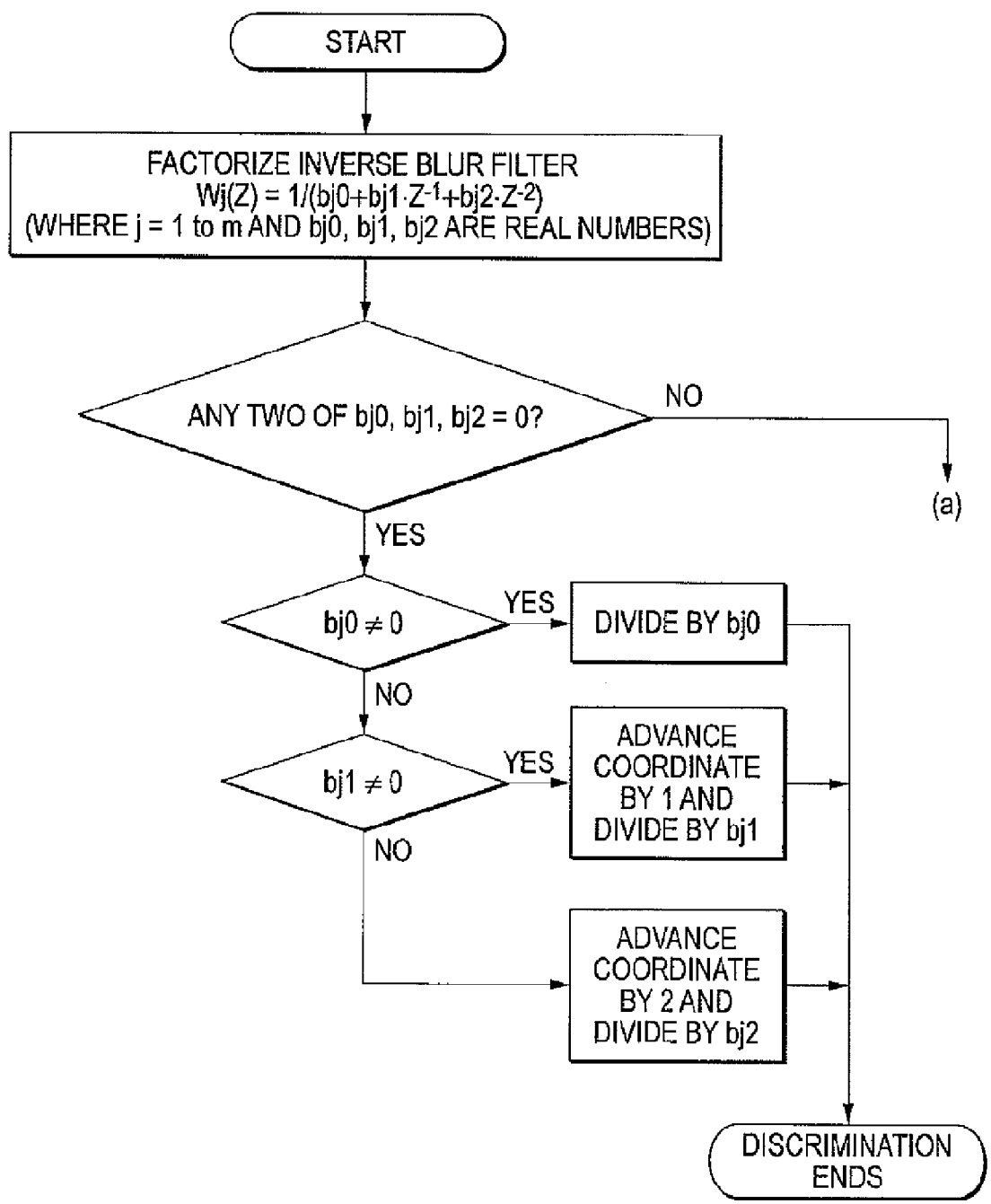
FIG. 12 is a flow diagram showing a procedure for classifying a filter by type on the basis of an inverse blur filter.

As shown in FIG. 12, it is determined as to whether or not any two of coefficients bj0, bj1 and bj2 of the inverse blur filter are equal to 0. When two of the coefficients bj0, bj1 and bj2 of the inverse blur filter are equal to 0, it is determined as to whether or not the coefficient bj0 is equal to 0. When the coefficient bj0 is equal to 0, it is determined as to whether or not the coefficient bj1 is equal to 0. When the coefficient bj1 is equal to 0, it is determined as to whether or not the coefficient bj2 is equal to 0.

When the coefficient bj0 is not equal to 0, factorization is performed by dividing the inverse blur filter by the coefficient bj0. When the coefficient bj1 is equal to not 0, a coordinate of a blurred image is advanced by one and factorization is performed by division by the coefficient bj1. When the coefficient bj2 is equal to not 0, the coordinate of the blurred image is advanced by two and factorization is performed by division by the coefficient bj2. After factorizing the inverse blur filter, the discrimination flow ends.

Figure 13:
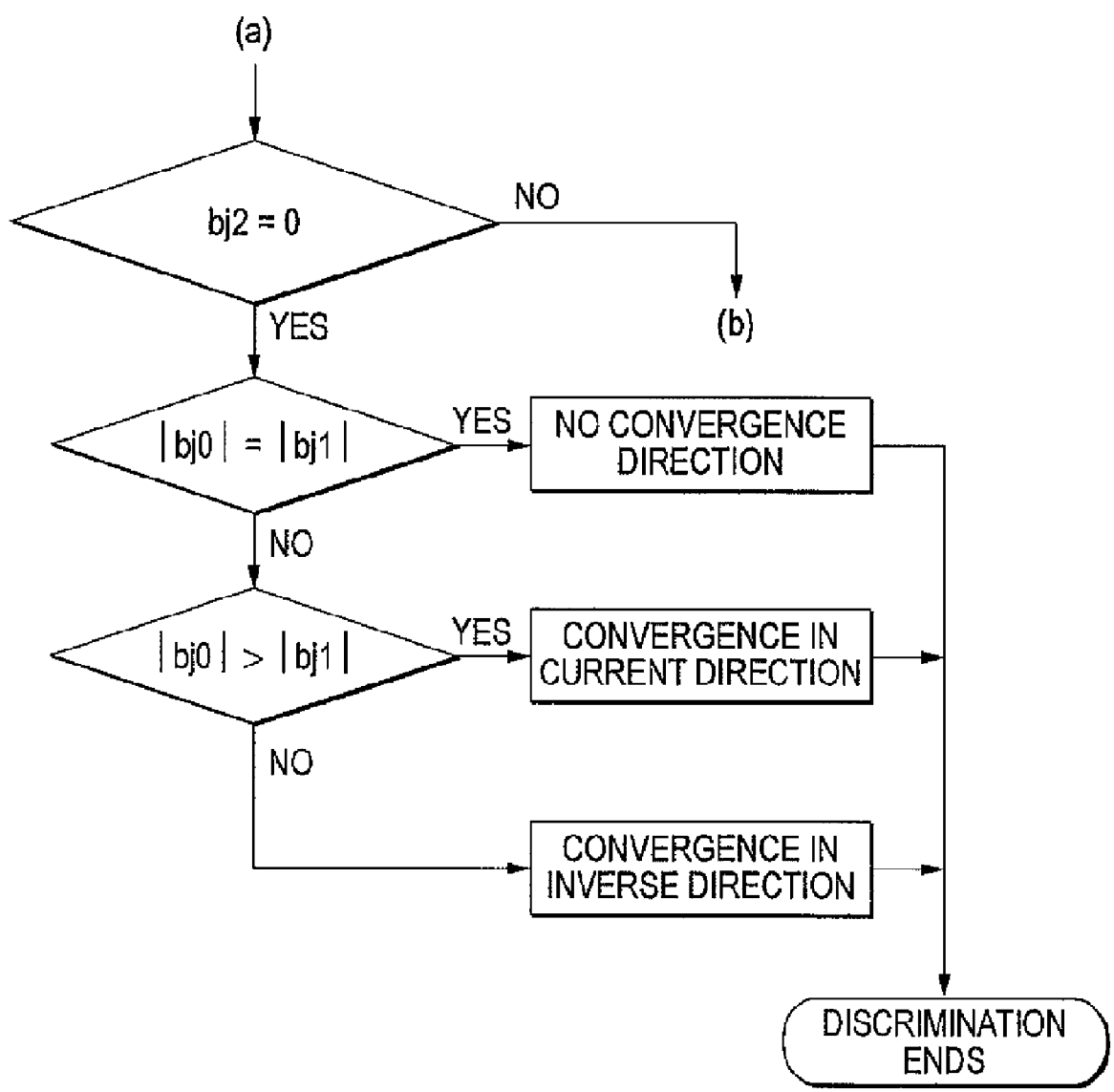
FIG. 13 is a flow diagram showing a procedure for classifying a filter by type on the basis of an inverse blur filter.

When any two of the coefficients bj0, bj1 and bj2 of the inverse blur filter are not equal to 0, it is determined as to whether or not the coefficient bj2 is equal to 0 as shown in FIG. 13. When the coefficient bj2 is equal to 0, it is determined as to whether or not absolute values of the coefficients bj0 and bj1 are equal to each other. When the absolute values of the coefficients bj0 and bj1 are not equal to each other, it is determined as to whether or not the absolute value of the coefficient bj0 is larger than that of the coefficient bj1. When the absolute value of the coefficient bj0 is not larger than that of the coefficient bj1, the absolute value of the coefficient bj0 is determined to be less than that of the coefficient bj1.

When the absolute values of the coefficients bj0 and bj1 are equal to each other, it is determined that the filter does not have a convergence direction. When the absolute value of the coefficient bj0 is larger than that of the coefficient bj1, it is determined that the filter converges in a current direction. When the absolute value of the coefficient bj0 is less than that of the coefficient bj1, it is determined that the filter converges in a direction reverse to the current direction. As described above, the discrimination flow ends after classifying a filter by type according to the magnitude relation between the absolute values of the coefficients bj0 and bj1.

If it is determined that the coefficient bj2 is not equal to 0, it is determined as to whether or not the coefficient bj1 is equal to 0. When the coefficient bj1 is equal to 0, it is determined as to whether absolute values of the coefficients bj0 and bj2 are equal to each other. When the absolute values of the coefficients bj0 and bj2 are not equal to each other, it is determined as to whether or not the absolute value of the coefficient bj0 is larger than that of the coefficient bj2. When the absolute value of the coefficient bj0 is not larger than that of the coefficient bj2, it is determined that the absolute value of the coefficient bj0 is less than that of the coefficient bj2.

When the absolute values of the coefficients bj0 and bj2 are equal to each other, it is determined that the filter does not have a convergence direction. When the absolute value of the coefficient bj0 is larger than that of the coefficient bj2, it is determined that the filter converges in the current direction. When the absolute value of the coefficient bj0 is less than that of the coefficient bj2, it is determined that the filter converges in the direction reverse to the current direction. As described above, the discrimination flow ends after classifying the filter by type according to the magnitude relation between the absolute values of the coefficients bj0 and bj2.

On the other hand, when the coefficient bj1 is not equal to 0, it is determined as to whether or not absolute values of the coefficients bj1 and bj2 are equal to each other. When the absolute values of the coefficients bj1 and bj2 are not equal to each other, it is determined as to whether or not the absolute value of the coefficient bj1 is larger than that of the coefficient bj2. When the absolute value of the coefficient bj1 is not larger than that of the coefficient bj2, it is determined that the absolute value of the coefficient bj1 is less than that of the coefficient bj2. When the absolute values of the coefficients bj1 and bj2 are equal to each other, it is determined that the filter does not have a convergence direction. When the absolute value of the coefficient bj1 is larger than that of the coefficient bj2, it is determined that the filter converges in the current direction. When the absolute value of the coefficient bj1 is less than that of the coefficient bj2, it is determined that the filter converges in the direction reverse to the current direction. As described above, the discrimination flow ends after classifying the filter by type according to the magnitude relation between the absolute values of the coefficients bj1 and bj2.

Separately from the above flow, an inverse blur filter may be expressed by the following expression.

$$Wj(Z) = bj0 Z^k \quad (22)$$

(where j=1~n, and bj0 is real number)

When the inverse blur filter is given as in the above Expression, the coordinate of the still image data in which blur occurs is advanced by k and the coefficient bj0 is multiplied. Then, a process for discriminating the filter type ends.

In this embodiment, a processing amount for filter processing can be reduced by classifying the filter, specifying the convergence direction, and performing filter processing for the still image data in which the blur has occurred. If a result of classifying the filter shows that still image data in which blur has occurred does not have a convergent direction, performed is image restoration for the case where the blur occurs at a constant velocity in a one-dimensional direction.

According to the second embodiment, a computer readable medium may store a program that causes a computer to execute a process for restoring a blurred image of a subject. The process includes: setting a one-dimensional direction of blur in the blurred image; computing blur characteristic information, which is expressed by a point spread function indicating spread of an image caused by the blur, based on the set one-dimensional direction; computing an impulse response of the blur characteristic information; and classifying the blur characteristic information by type based on the impulse response.

Also, according to the second embodiment, a computer readable medium may store a program that causes a computer to execute a process for restoring a blurred image of a subject. The process includes: setting a one-dimensional direction of blur in the blurred image; computing blur characteristic information, which is expressed by a point spread function indicating spread of an image caused by the blur, based on the set one-dimensional direction; and classifying the blur characteristic information by type by factorizing an inverse blur characteristic function expressed by an inverse function of the point spread function.

In this embodiment, the image data restoration program may be run on an arithmetic processing device. For example, the image data restoration program may be run on an arithmetic section built in a digital camera or a central processing unit of a personal computer.

According to the second embodiment, an image data restoration apparatus for restoring a blurred image of a subject may include a setting unit, a first computing unit, a second computing unit and a classifying unit. The setting unit sets a one-dimensional direction of blur in the blurred image. The first computing unit computes blur characteristic information, which is expressed by a point spread function indicating spread of an image caused by the blur, based on the set one-dimensional direction. The second computing unit computes an impulse response of the blur characteristic information. The classifying unit classifies the blur characteristic information by type based on the impulse response.

Also, according to the second embodiment, an image data restoration apparatus for restoring a blurred image of a subject may include a setting unit, a computing unit and a classifying unit. The setting unit sets a one-dimensional direction of blur in the blurred image. The computing unit computes blur characteristic information, which is expressed by a point spread function indicating spread of an image caused by the blur, based on the set one-dimensional direction. The classifying unit classifies the blur characteristic information by type by factorizing an inverse blur characteristic function expressed by an inverse function of the point spread function.

For example, the image data restoration apparatus may execute each section with the image data restoring section having the configuration shown in FIG. 1.

Third Embodiment

Figure 14A:
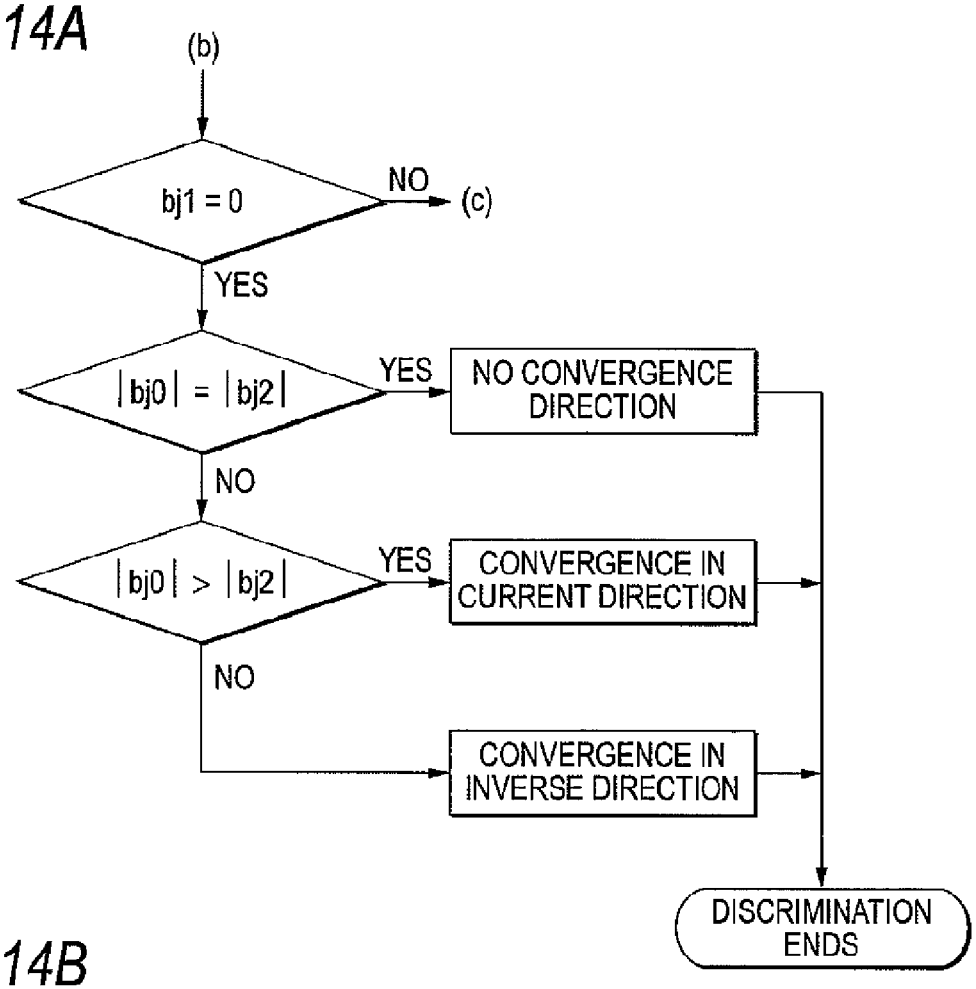
FIG. 14 is a flow diagram showing a procedure for classifying a filter by type on the basis of an inverse blur filter.
Figure 14B:
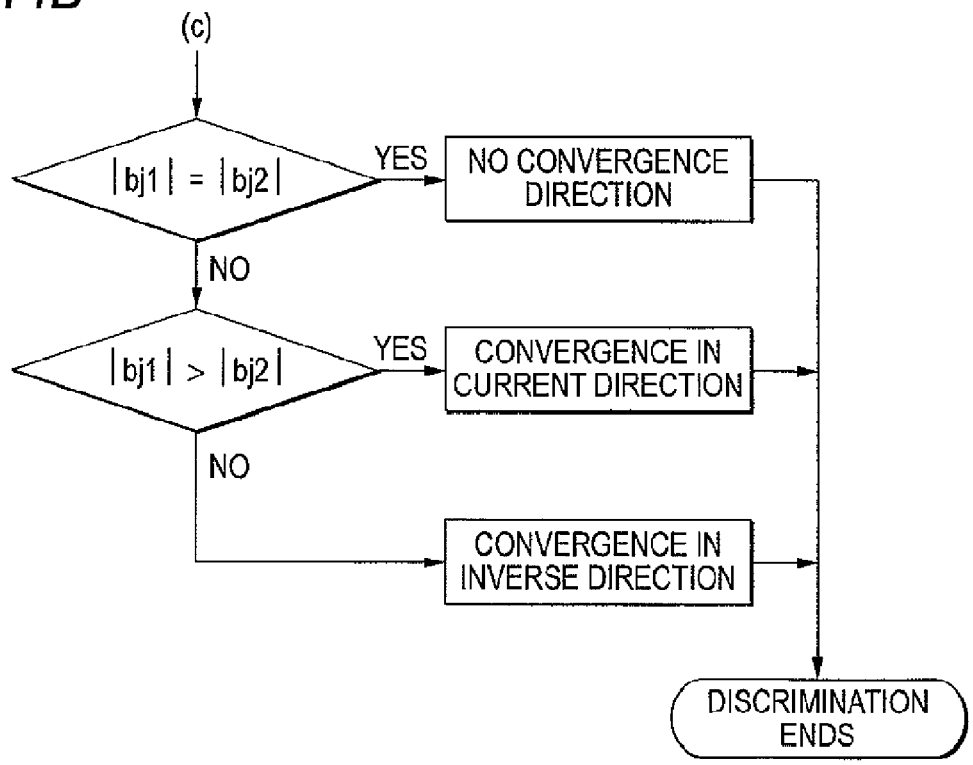
Figure 15:
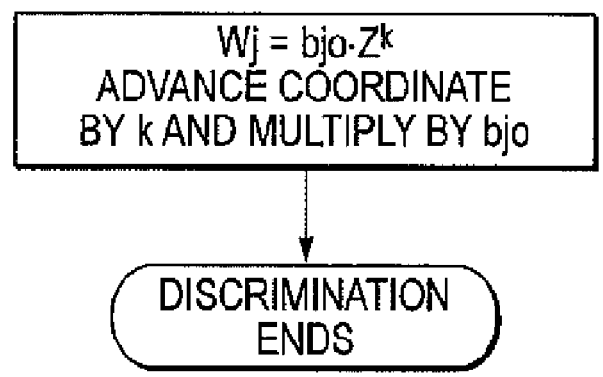
FIG. 15 is a flow diagram showing a procedure separated from the flows shown in FIGS. 12 to 14.

Filters are integrated and processed according to types of filters classified in the flowcharts shown in FIGS. 12~14. In this embodiment, filters are integrated in terms of each of the above-described four types, that is, (i) the type in which convergence is achieved when an input is given in the up-to-down direction, (ii) the type in which convergence is achieved when an input is given in the down-to-up direction, (iii) the type in which there is no convergence direction, and (iv) the type in which an ideal image coincides with the original image by shifting coordinates. However, a filter type is not limited to the above-described filter types and may be classified according to requirement deriving from blur correction processing (recovery processing).

In general, a plurality of filters may be expressed by the following expression. Herein, N filters are expressed.

$$Wj(Z)=1/(aj0+aj1Z^{-1}+aj2Z^{-2}) \quad (23)$$

(where j=1, 2, ... N, and aj0, aj1, aj2 are real numbers)

Alternatively, the N filters may be expressed by the following expression.

$$Wj(Z)=aj0Z^k \quad (24)$$

(where j=1, 2, ... N, and aj0 is real number)

Expressions (23) and (24) are classified into the types of (i) to (iv). Then, filters of each type are integrated as shown in the following expressions.

$$Wd(Z) = 1 \Big/ \sum_{i=0}^{m} adiZ^{-i} \quad (25\text{-}1)$$

(where adi are real numbers)

$$Wu(Z) = 1 \Big/ \sum_{i=0}^{l} auiZ^{-i} \quad (25\text{-}2)$$

(where aui are real numbers)

$$Wr(Z) = 1 \Big/ \sum_{i=0}^{k} ariZ^{-i} \quad (25\text{-}3)$$

(where ari are real numbers)

$$Ws(Z)=1/as0Z^k \quad (25\text{-}4)$$

(where as0 is real number)

Expression (25-1) is a polynomial obtained by integrating filters of the type in which convergence is achieved when an input is made in the up-to-down direction. Expression (25-2) is a polynomial obtained by integrating filters of the type in which convergence is achieved when an input is made in the down-to-up direction. Expression (25-3) is a polynomial obtained by integrating filters of the type in which there is no convergence direction. Expression (25-4) is a polynomial obtained by integrating filters of the type in which an ideal image coincides with the original image by shifting coordinates.

With regard to the types of filters integrated as in Expression (25-3), there is a case where it is be preferable to perform processing without integration. For example, in the case of Expression (25-3), the integrated filters may diverge in the course of processing.

After the filters are integrated, all processes are completed by carrying out an arithmetic operation according to the integrated filters. At this time, an order in which the integrated filters are computed is not specifically limited. The computing with the respective filters may be executed in an arbitral order.

According to this embodiment, the number of times of processing can be reduced by integrating the filters for each type. If the filters to be integrated as in Expression (25-3) are not integrated, the number of times of processing increases. However, the number of times of processing can be reduced by integrating the filters as in Expressions (25-1), (25-2) and (25-4).

Next, the effect of integrated filters is determined on the basis of coefficients of the point spread function. The still image data in which blur has occurred is originally transferred from the original subject image. The inventors have paid attention to that pixels constituting blur of the still image data in which the blur has occurred is transferred from several pixels of the original image. For example, FIG. 2 shows the case where three pixels of the original image (or ideal still image data) serving as blur are transferred to the still image data in which the blur has occurred.

In other words, except a pattern in which a coordinate of blur is shifted, when blur characteristic information of the blurred image is expressed by the following Expression (26), spread of the coefficients A0, A1, A2 ..., An is considered as an influence degree of blur characteristic information when filter processing is applied to the still image data in which the blur has occurred.

$$W(Z)=1/(A0+A1Z^{-1}+A2Z^{-2} \ldots +AnZ^{-n}) \quad (26)$$

(where n is an integer, and A0, A1, A2, ... An are real numbers)

Figure 16:
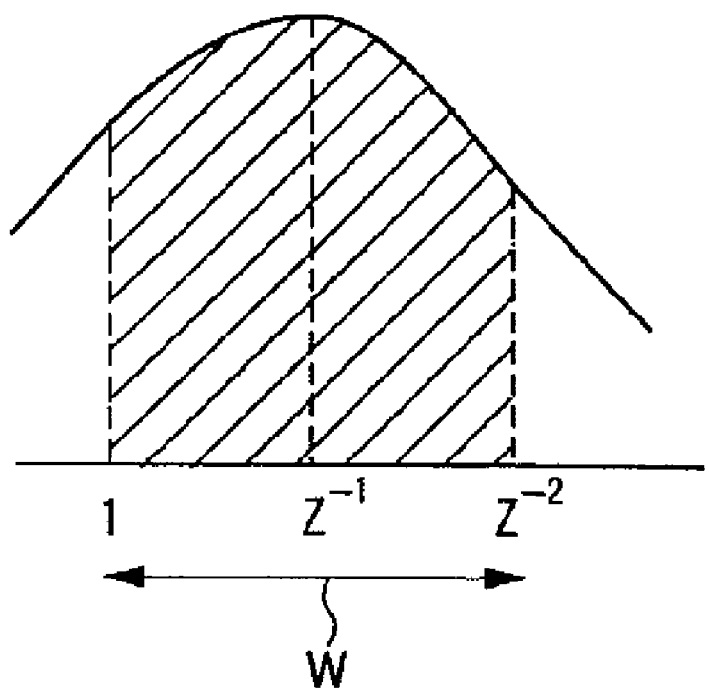
FIG. 16 is a view showing spread of blur characteristic information.

FIG. 16 is a view showing the spread of blur characteristic information. In FIG. 16, the horizontal direction (x direction) represents $Z, Z^{-1}, Z^{-2}, \ldots, Z^{-n}$ in the point spread function of the blur characteristic information, and the vertical direction represents coefficients corresponding to $Z, Z^{-1}, Z^{-2}, \ldots, Z^{-n}$. FIG. 16 shows a graph when three pixels of the original image (ideal still image data) are transferred, due to blur, to the still image data in which the blur occurs. In the case of the blur of three pixels, a determination is made on the basis of the coefficients A0, A1, A2 respectively corresponding to $Z, Z^{-1}, Z^{-2}$.

In FIG. 16, an arrow W indicates the spread of the point spread function. In this embodiment, the spread is defined by a range that occupies more than 80% of a predefined total range including all the coefficients.

Alternatively, the spread W may be defined as variance or standard deviation of the point spread function.

As the spread W increases, highly effective processing as the blur filter can be performed. Thus, in this embodiment, filter processing is performed with the blur characteristic information in order of spread of the blur characteristic information from largest. When the spread is less than a predetermined value, it may be determined that it is difficult to perform highly effective processing as a blur filter, and the filter processing may not be performed based on such blur characteristic information.

In this embodiment, the spread of the blur characteristic information is determined after classifying the blur characteristic information and integrating the blur characteristic information for each type. Alternatively, the spread of the blur characteristic information may be determined before the integrating. Since the number of times of processing for determining the spread is reduced by determining the spread of the blur characteristic information after the integrating, the number of times of processing and the processing time period can be further shortened.

According to the third embodiment, a type of blur characteristic information is determined using the blur characteristic information, which is expressed by the point spread function of an image caused by the blur, and the effect of the blur characteristic information for each type is determined. The still image data in which the blur has occurred is transferred from the original image. Thus, a pixel affecting blur of the still image data in which the blur has occurred is computed from coefficient values of the point spread function in that the pixels are transferred from several pixels of the original image. Thereby, the still image data in which the blur has occurred can be processed with a suitable filter. Also, when filter processing is performed with blur characteristic information in order of spread of the blur characteristic information from largest, the number of times of processing can be reduced and the processing time period and the processing burden can be reduced.

According to the third embodiment, a computer readable medium may store a program that causes a computer to execute a process for restoring a blurred image of a subject. The process includes: setting a one-dimensional direction of blur in the blurred image; computing blur characteristic information, which is expressed by a point spread function indicating spread of an image caused by the blur, based on the set one-dimensional direction; classifying the blur characteristic information by type; determining spread based on coefficients of the point spread function; and performing filter processing with the blur characteristic information in order of spread of the blur characteristic information from largest.

Also, the spread may be defined by a range that occupies more than 80% of a total range representing the point spread function. Alternatively, the spread may be defined by a standard deviation or variance of the point spread function.

Also, the process may further include integrating the blur characteristic information for each type of the blur characteristic information. The spread may be determined after the integrating.

Also, the process may further include computing an impulse response of the blur characteristic information. The type of the blur characteristic information may be determined based on the impulse response.

The image data restoration program of this embodiment may run on an arithmetic processing device. For example, the image data restoration program ma be run on an arithmetic section built in a digital camera or a central processing unit of a personal computer.

According to the third embodiment, an image data restoration apparatus for restoring a blurred image of a subject includes a computing unit, a classifying unit, a determining unit and a filtering unit. The computing unit sets a one-dimensional direction of blur in the blurred image. The computing that computes blur characteristic information, which is expressed by a point spread function indicating spread of an image caused by the blur, based on the set one-dimensional direction. The classifying unit classifies the blur characteristic information by type. The determining unit determines spread based on coefficients of the point spread function. The filtering unit performs filter processing with the blur characteristic information in order of spread of the blur characteristic information from largest.

Also, the spread may be defined by a range that occupies more than 80% of a total range representing the point spread function. Alternatively, the spread may be defined by a standard deviation or variance of the point spread function.

Also, the determining unit may integrate the blur characteristic information for each type of the blur characteristic information and then determines the spread.

Also, the classifying unit may compute an impulse response of the blur characteristic information and then, determine the type of the blur characteristic information based on the impulse response.

For example, the image data restoration apparatus may execute each section using the image data restoring section 60 having the configuration shown in FIG. 1.

Fourth Embodiment

An influence degree representing a susceptibility to an error during filter processing can be determined on the basis of an inverse function of a point spread function of blur characteristic information for each filter (blur characteristic information) classified in the flowcharts shown in FIGS. 12 to 14.

If a desired pixel of ideal still image data is computed from near pixel(s) in correction of the still image data in which blur has occurred, the error does not influence image quality of the corrected image. On the other hand, if far pixel(s) is used for a desired pixel of the ideal still image data, the influence of error to the image quality increases.

If a far pixel is used for a desired pixel of the ideal still image data, an inverse function of a point spread function representing the blur characteristic information has a characteristic in which a number of terms constituting a polynomial increases in correspondence with a number of pixels to be used, as shown in the following expression.

$$Wa(Z) = A + BZ^{-1} \tag{27-1}$$

$$Wb(Z) = A + BZ^{-1} + CZ^{-2} \tag{27-2}$$

$$Wc(Z) = A + BZ^{-1} + CZ^{-2} + DZ^{-3} \tag{27-3}$$

(where A, B, C and D are real numbers)

Since an inverse function Wa shown in Expression (27-1) has a smaller number of terms than an inverse function Wb shown in Expression (27-2), the number of pixels to be used for correction are small and the influence of error is small when filter processing is performed. At this time, it is determined that an influence degree of the inverse function Wb is larger than that of the inverse function Wa. Similarly, since the inverse function Wb shown in Expression (27-2) has a smaller number of terms than an inverse function Wc shown in Expression (27-3), the influence of error is small when filter processing is performed. At this time, it is determined that an influence degree of the inverse function Wc is larger than that of the inverse function Wb.

In this embodiment, the influence degree is determined for each of (i) the type in which convergence is achieved when an input is given in the up-to-down direction, (ii) the type in which convergence is achieved when an input is given in the down-to-up direction, (iii) the type in which there is no convergence direction, and (iv) the type in which an ideal image coincides with the original image by shifting coordinates, which are classified as described above.

Since the filter of (iv) corrects blur by shifting coordinates, error has no influence on image quality. Since the filter of (iii) requires a far pixel for a desired pixel, the influence degree increases. It is checked as to which filter of the type (i) or (ii) requires a farther pixel, and then it is determined that the influence degree of the filter requiring the farther pixel is higher.

In this embodiment, filter processing is performed in descending order of influence degrees of the filters. Thus, the influence of error occurring upon blur correction (recovery processing) can be suppressed.

As shown in FIG. 17, the influence degree of each filter is stored in a recording section such as a memory in a state where a filter type, an influence degree, and an order of filter processing are associated with each other.

The influence degree may serve as the effect when the blurred image is restored.

Alternatively, the spread W may be defined by variance or standard deviation of the point spread function. As the spread W is larger, the effect of the blur filter is larger. As the spread W is smaller, the effect of the blur filter is smaller. In this embodiment, after the spread is determined, filter processing is performed with blur characteristic information in order of the spread of the blur characteristic information from largest. When the spread is less than a predetermined value, filtering processing on the basis of the blur characteristic information may be performed since it would be difficult to execute highly effective processing as a blur filter.

According to this embodiment, a type of a filter is classified, and it is determined an influence degree of error during filter processing of the classified inverse blur characteristic using an inverse blur characteristic, which is expressed by an inverse function of a point spread function of an image caused by blur. When the influence degree of the inverse blur characteristic is high, the influence of error upon filter processing is large. For this reason, it is preferable to first perform filter processing with the inverse blur characteristic of the high influence degree rather than that of the low influence degree. In this embodiment, the determined influence degree can be referenced when an order of filter processing is determined. Therefore, filter processing can be suitably performed according to each classified inverse blur characteristic while suppressing an influence of error. The burden of image processing can be reduced and the processing period of time can be shortened, by referencing the influence degree to perform filter processing.

According to the fourth aspect of the invention, a computer readable medium stores a program that causes a computer to execute a process for restoring a blurred image of a subject. The process includes: setting a one-dimensional direction of blur in the blurred image; computing blur characteristic information, which is expressed by a point spread function indicating spread of an image caused by the blur, based on the set one-dimensional direction; classifying the blur characteristic information by type; and determining an influence degree of each classified blur characteristic information.

Also, the influence degree may indicate a susceptibility to an error during correction of the blurred image. Alternatively, the influence degree may indicate an effect when the blurred image is restored.

If the influence degree may indicate a susceptibility to an error during correction of the blurred image, the process may further include performing filter processing with the blur characteristic in order of the influence degree of the blur characteristic information from largest. With this configuration, the influence of error affecting still image data in which blur has occurred can be suppressed.

The image data restoration program according to this embodiment may be run on an arithmetic processing device. For example, the image data restoration program may be run on an arithmetic section embedded in a digital camera or a central processing unit of a personal computer.

According to the fourth aspect, an image data restoration apparatus for restoring a blurred image of a subject includes a computing unit, a classifying unit and a determining unit. The computing unit sets a one-dimensional direction of blur in the blurred image. The computing unit computes blur characteristic information, which is expressed by a point spread function indicating spread of an image caused by the blur, based on the set one-dimensional direction. The classifying unit classifies the blur characteristic information by type. The determining unit determines an influence degree of each classified blur characteristic information.

Also, the influence degree may indicate a susceptibility to an error during correction of the blurred image. Alternatively, the influence degree indicates an effect when the blurred image is restored.

If the influence degree may indicate a susceptibility to an error during correction of the blurred image, the process may further include performing filter processing with the blur characteristic in order of the influence degree of the blur characteristic information from largest.

For example, the image data restoration apparatus may execute each section in the image data restoring section having the configuration as shown in FIG. 1.

What is claimed is:

1. An image data restoration apparatus for restoring still image data acquired by capturing a subject image with an imaging element, on a basis of blur information regarding blur in a one-dimensional direction of the imaging element upon image capturing, the apparatus comprising:

an image data recovering unit that multiplies the still image data and a recovery matrix to recover ideal image data, wherein:
the recovery matrix is used to recover, from the still image data, the ideal image data which is acquired upon capturing the subject image in a state where there is no blur based on the blur information, and
the recovery matrix is a pseudo inverse matrix of a blur matrix that represents spread in the one-dimensional direction of the ideal image data due to the blur based on the blur information;

a noise computing unit that computes a plurality of types of noises that derive from the recovery matrix, the plurality of types of noises being periodically superimposed on the image data recovered by the image data recovering unit toward the one-dimensional direction; and a noise eliminating unit that eliminates the noise computed by the noise computing unit, from the image data recovered by the image data recovering unit, wherein:

the recovery matrix is an inverse matrix of an approximate matrix, the approximate matrix being obtained by approximating the blur matrix, the approximate matrix being defined so as to extrapolate a predetermined value into values of image data that spreads from an end portion of the ideal image data to an outer side in the one-dimensional direction according to the blur based on the blur information, and the noise computing unit computes the plurality of types of noises on a basis of (i) noise period information regarding a noise superimposition period of each of the plurality of types of noises, the noise period information being computed according to a product of the recovery matrix and the blur matrix, (ii) the image data recovered by the image data recovering unit, and (iii) the still image data.

2. The image data restoration apparatus according to claim 1, wherein the predetermined value is a value of image data which is in the end portion of the ideal image data.

3. The image data restoration apparatus according to claim 1, further comprising:
a noise period information generating unit that generates the noise period information according to the product of the recovery matrix and the blur matrix.

4. The image data restoration apparatus according to claim 1, wherein the noise computing unit reads the noise period information corresponding to the blur information from a recording medium in which the noise period information corresponding to the blur information is recorded in advance, and uses the read noise period information to compute the noises.

5. The image data restoration apparatus according to claim 1, wherein:
each of the still image data and the image data recovered by the image data recovering unit has a plurality of pixel data columns arranged in a direction perpendicular to the one-dimensional direction,
each pixel data column is configured to include plural pieces of pixel data aligned in the one-dimensional direction,
the noise computing unit comprises
a first sampling unit that samples the pixel data of each pixel data column of the still image data, which is a recovery source of the corresponding pixel data column of the image data recovered by the image data recovering unit, at every noise superimposition period based on the noise period information,
a second sampling unit that samples the pixel data of each pixel data column, which is recovered from the corresponding pixel data column of the still image data as the recovery source, a same number of times as the first sampling unit samples, at every noise superimposition period based the noise period information, and
a dividing unit that computes the noises by dividing a value, which is obtained by subtracting an integrated value of the pixel data sampled by the first sampling unit from an integrated value of the pixel data sampled by the second sampling unit, by the number of times of sampling.

6. The image data restoration apparatus according to claim 1, further comprising:
a blur matrix generating unit that generates the blur matrix on the basis of the blur information;
an approximate matrix generating unit that generates the approximate matrix from the blur matrix generated by the blur matrix generating unit; and
a recovery matrix generating unit that generates the recovery matrix by computing the inverse matrix of the approximate matrix generated by the approximate matrix generating unit.

7. The image data restoration apparatus according to claim 1, further comprising:
a reading unit that reads the recovery matrix corresponding to the blur information from a recording medium in which the recovery matrix corresponding to the blur information is recorded in advance.

8. An imaging apparatus comprising:
the image data restoration apparatus according to claim 1;
the imaging element;
a still image data generating unit that generates the still image data from an output signal of the imaging element; and
a blur information generating unit that generates the blur information by detecting blur in the one-dimensional direction of the imaging element upon image capturing.

9. An image data restoration method for restoring still image data acquired by capturing a subject image with an imaging element, on a basis of blur information regarding blur in a one-dimensional direction of the imaging element upon image capturing, the method comprising:
multiplying the still image data and a recovery matrix to recover ideal image data, wherein:
the recovery matrix is used to recover, from the still image data, the ideal image data which is acquired upon capturing the subject image in a state where there is no blur based on the blur information, and
the recovery matrix is a pseudo inverse matrix of a blur matrix that represents spread in the one-dimensional direction of the ideal image data due to the blur based on the blur information;
computing a plurality of types of noises that derive from the recovery matrix, the plurality of types of noises being periodically superimposed on the recovered image data toward the one-dimensional direction; and
eliminating the computed noise from the recovered image data, wherein:
the recovery matrix is an inverse matrix of an approximate matrix, the approximate matrix being obtained by approximating the blur matrix, the approximate matrix being defined so as to extrapolate a predetermined value into values of image data that spreads from an end portion of the ideal image data to an outer side in the one-dimensional direction according to the blur based on the blur information, and
the computing of the plurality of types of noises comprises computing the plurality of types of noises on a basis of (i) noise period information regarding a noise superimposition period of each of the plurality of types of noises, the noise period information being computed according to a product of the recovery matrix and the blur matrix, (ii) the recovered image data, and (iii) the still image data.

10. The image data restoration method according to claim 9, wherein the predetermined value is a value of image data which is in the end portion of the ideal image data.

11. The image data restoration method according to claim 9, further comprising:
generating the noise period information according to the product of the recovery matrix and the blur matrix.

12. The image data restoration method according to claim 9, wherein the computing of the noises further comprises
reading the noise period information corresponding to the blur information from a recording medium in which the noise period information corresponding to the blur information is recorded in advance, and
using the read noise period information to compute the noises.

13. The image data restoration method according to claim 9, wherein:
each of the still image data and the recovered image data has a plurality of pixel data columns arranged in a direction perpendicular to the one-dimensional direction,
each pixel data column is configured to include plural pieces of pixel data aligned in the one-dimensional direction,
the computing of the noises further comprises
(a) sampling the pixel data of each pixel data column of the still image data, which is a recovery source of the corresponding pixel data column of the recovered image data, at every noise superimposition period based on the noise period information, (b) sampling the pixel data of each pixel data column, which is recovered from the corresponding pixel data column of the still image data as the recovery source, a same number of times as the (a) sampling is performed, at every noise superimposition period based the noise period information, and (c) computing the noises by dividing a value, which is obtained by subtracting an integrated value of the pixel data sampled by the (a) sampling from an integrated value of the pixel data sampled by the (b) sampling, by the number of times of sampling.

14. The image data restoration method according to claim 9, further comprising:
generating the blur matrix on the basis of the blur information;
generating the approximate matrix from the generated blur matrix; and
generating the recovery matrix by computing the inverse matrix of the generated approximate matrix.

15. The image data restoration method according to claim 9, further comprising:
reading the recovery matrix corresponding to the blur information from a recording medium in which the recovery matrix corresponding to the blur information is recorded in advance.

16. A computer recording medium storing a program causing a computer to execute a process of restoring still image data acquired by capturing a subject image with an imaging element, on a basis of blur information regarding blur in a one-dimensional direction of the imaging element upon image capturing, the process comprising:

multiplying the still image data and a recovery matrix to recover ideal image data, wherein:
the recovery matrix is used to recover, from the still image data, the ideal image data which is acquired upon capturing the subject image in a state where there is no blur based on the blur information, and
the recovery matrix is a pseudo inverse matrix of a blur matrix that represents spread in the one-dimensional direction of the ideal image data due to the blur based on the blur information;
computing a plurality of types of noises that derive from the recovery matrix, the plurality of types of noises being periodically superimposed on the recovered image data toward the one-dimensional direction; and
eliminating the computed noise from the recovered image data, wherein:
the recovery matrix is an inverse matrix of an approximate matrix, the approximate matrix being obtained by approximating the blur matrix, the approximate matrix being defined so as to extrapolate a predetermined value into values of image data that spreads from an end portion of the ideal image data to an outer side in the one-dimensional direction according to the blur based on the blur information, and
the computing of the plurality of types of noises comprises computing the plurality of types of noises on a basis of (i) noise period information regarding a noise superimposition period of each of the plurality of types of noises, the noise period information being computed according to a product of the recovery matrix and the blur matrix, (ii) the recovered image data, and (iii) the still image data.

* * * * *